United States Patent
Tang et al.

(10) Patent No.: US 12,048,897 B2
(45) Date of Patent: Jul. 30, 2024

(54) FORWARD OSMOSIS MEMBRANE AND METHOD OF FORMING A FORWARD OSMOSIS MEMBRANE

(75) Inventors: Chuyang Tang, Singapore (SG); Changquan Qiu, Singapore (SG); Jing Wei, Singapore (SG); Rong Wang, Singapore (SG); Anthony G. Fane, Singapore (SG)

(73) Assignee: Nanyang Technological University, Singapore (SG)

( * ) Notice: Subject to any disclaimer, the term of this patent is extended or adjusted under 35 U.S.C. 154(b) by 57 days.

(21) Appl. No.: 13/981,876

(22) PCT Filed: Jan. 25, 2012

(86) PCT No.: PCT/SG2012/000023
§ 371 (c)(1),
(2), (4) Date: Sep. 30, 2013

(87) PCT Pub. No.: WO2012/102680
PCT Pub. Date: Aug. 2, 2012

(65) Prior Publication Data
US 2014/0008291 A1    Jan. 9, 2014

Related U.S. Application Data

(60) Provisional application No. 61/435,959, filed on Jan. 25, 2011.

(51) Int. Cl.
*B01D 61/00* (2006.01)
*B01D 67/00* (2006.01)
(Continued)

(52) U.S. Cl.
CPC ....... *B01D 67/0016* (2013.01); *B01D 61/002* (2013.01); *B01D 67/0009* (2013.01);
(Continued)

(58) Field of Classification Search
CPC ...... B01D 61/00; B01D 61/002; B01D 61/02; B01D 61/025; B01D 61/027; B01D 61/08;
(Continued)

(56) References Cited

U.S. PATENT DOCUMENTS 3,133,132 A * 5/1964 Loeb ............... B01D 63/10
264/49
3,360,459 A * 12/1967 King ............... B01D 67/0011
210/639
(Continued)

FOREIGN PATENT DOCUMENTS

EP    0142973 A2 * 5/1985
GB    1107066 A * 3/1968 ............. B01D 69/04
(Continued)

OTHER PUBLICATIONS

Song et al., Preparation, Characterization, and Application of Thin Film Composite Nanofiltration Membranes, 95 J. Appl. Polym. Sci. 1251, 1251-1261 (2005). (Year: 2005).*
(Continued)

*Primary Examiner* — Pranav N Patel
(74) *Attorney, Agent, or Firm* — Seed IP Law Group LLP

(57) ABSTRACT

A method of forming a forward osmosis membrane having a porous substrate and a rejection layer is provided. The method comprises a) forming a thin film of a polymer solution on a suitable substrate, wherein the polymer solution contains at least one polymer and optionally one or more additives in a suitable solvent, b) immersing the thin film in a coagulant bath to form the porous substrate; and c) forming a rejection layer on the porous substrate. A forward osmosis membrane is also provided.

13 Claims, 21 Drawing Sheets

(51) Int. Cl.
*B01D 69/10* (2006.01)
*B01D 69/12* (2006.01)

(52) U.S. Cl.
CPC ..... *B01D 69/1071* (2022.08); *B01D 69/1251* (2022.08); *B01D 2323/18* (2013.01); *B01D 2323/22* (2013.01); *B01D 2325/026* (2013.01); *B01D 2325/20* (2013.01)

(58) Field of Classification Search
CPC .... B01D 61/14; B01D 61/145; B01D 61/147; B01D 61/18; B01D 63/00; B01D 63/02; B01D 63/021; B01D 63/06; B01D 63/061; B01D 63/062; B01D 63/065; B01D 67/00; B01D 37/0002; B01D 67/0006; B01D 67/0009; B01D 67/0011; B01D 67/0013; B01D 67/0016; B01D 67/0079; B01D 67/0081; B01D 67/0088; B01D 61/0093; B01D 69/10; B01D 69/12; B01D 69/122; B01D 69/125; B01D 69/14; B01D 69/141; B01D 71/00; B01D 71/06; B01D 71/52; B01D 71/58; B01D 71/66; B01D 71/68; B01D 71/78; B01D 71/80; B01D 71/82; B01D 2201/04; B01D 2201/0407; B01D 2201/0415; B01D 2239/04; B01D 2239/0407; B01D 2239/0414; B01D 2239/06; B01D 2239/0604; B01D 2239/0613; B01D 2239/065; B01D 2239/10; B01D 2239/1208; B01D 2259/12; B01D 2259/124; B01D 2323/00; B01D 2323/18; B01D 2323/22; B01D 2323/30; B01D 2323/40; B01D 2323/50; B01D 2325/00; B01D 2325/02; B01D 2325/022; B01D 2325/023; B01D 2325/025; B01D 2325/026; B01D 2325/20
USPC .............................. 210/499, 500.21; 427/243
See application file for complete search history.

(56) References Cited

U.S. PATENT DOCUMENTS

| | | | | |
|---|---|---|---|---|
| 3,699,038 A * | 10/1972 | Boom | ............... | B01D 71/62 |
| | | | | 210/500.28 |
| 3,737,042 A * | 6/1973 | Boom | ............... | B01D 71/62 |
| | | | | 210/500.39 |
| 3,759,738 A * | 9/1973 | Misumi et al. | ........ | B01D 69/10 |
| | | | | 427/551 |
| 4,203,848 A * | 5/1980 | Grandine, II | ...... | B01D 67/0011 |
| | | | | 264/41 |
| 4,244,817 A * | 1/1981 | Yaginuma | ............ | B01D 69/125 |
| | | | | 210/500.33 |
| 4,840,733 A * | 6/1989 | Sasaki | ............... | B01D 69/06 |
| | | | | 210/500.41 |
| 4,919,810 A * | 4/1990 | Itoh | .................. | B01D 67/0016 |
| | | | | 210/500.34 |
| 5,387,378 A * | 2/1995 | Pintauro | ............ | B01D 61/362 |
| | | | | 264/41 |
| 5,658,460 A * | 8/1997 | Cadotte | ............. | B01D 67/0095 |
| | | | | 210/490 |
| 5,906,742 A * | 5/1999 | Wang | ................. | B01D 67/0011 |
| | | | | 264/41 |
| 5,919,370 A * | 7/1999 | Rottger | ................. | B01D 69/08 |
| | | | | 210/500.21 |
| 6,258,272 B1 * | 7/2001 | Wang | ................. | B01D 67/0011 |
| | | | | 210/500.27 |
| 7,445,712 B2 | 11/2008 | Herron | | |
| 8,846,967 B2 * | 9/2014 | Hansel | ................ | C07F 9/091 |
| | | | | 558/132 |
| 2003/0198825 A1* | 10/2003 | Mayes | ............. | B01D 67/0011 |
| | | | | 428/522 |
| 2005/0173341 A1* | 8/2005 | Salinaro | .................. | C02F 1/444 |
| | | | | 210/636 |
| 2006/0099414 A1* | 5/2006 | Koops | ............... | B01D 67/0018 |
| | | | | 428/364 |
| 2007/0039874 A1* | 2/2007 | Kniajanski | ........... | B01D 61/025 |
| | | | | 210/500.37 |
| 2008/0210624 A1* | 9/2008 | Li | ...................... | B01D 67/0011 |
| | | | | 210/500.23 |
| 2009/0272692 A1 | 11/2009 | Kurth et al. | | |
| 2010/0108599 A1* | 5/2010 | Vizvardi | ............ | B01D 67/0011 |
| | | | | 210/500.23 |
| 2011/0031100 A1* | 2/2011 | Qtaishat | ............... | B01D 61/364 |
| | | | | 202/205 |
| 2012/0080378 A1* | 4/2012 | Revanur | ................ | F04B 19/00 |
| | | | | 210/644 |
| 2012/0318729 A1* | 12/2012 | Yip | ..................... | B01D 61/002 |
| | | | | 210/490 |
| 2013/0047844 A1* | 2/2013 | Zheng | ................. | B01D 67/003 |
| | | | | 95/45 |

FOREIGN PATENT DOCUMENTS

| | | | | |
|---|---|---|---|---|
| NL | 8104496 A * | 5/1983 | ........ | B01D 67/0011 |
| WO | 2004027460 A2 | 4/2004 | | |
| WO | 2010144057 A1 | 12/2010 | | |

OTHER PUBLICATIONS

Sidney Loeb and Srinivasa Sourirajan, Sea Water Demineralization by Means of an Osmotic Membrane, Adv. Chem. Ser. 117, 125-129 (1963). (Year: 1963).*
Shen et al., Effect of Pore-forming Agents on Structure and Properties of PVDF/PVC Blend Membranes, 79-82 Adv. Mat. Res. 1627, 1627-1630 (2009).*
Fontananova et al., Effect of additives in the casting solution on the formation of PVDF membranes, 192 Desalination 190, 193-194 (2006).*
Shi et al., Effect of additives on the fabrication of poly(vinylidene fluoride-co-hexafluropropylene)(PVDF-HFP) asymmetric microporous hollow fiber membranes, 315 J. Membrane Sci. 195, 195-204 (2008).*
5 Wilbur Johnson, Jr., C13-14 Isoparrafins: CIR Expert Panel Meeting, 2, 19 Green Book (2010).*
Achilli et al., "The forward osmosis membrane bioreactor: A low fouling alternative to MBR processes," Desalination 239:10-21, 2009.
Cath et al., "Forward Osmosis: Principles, applications, and recent developments," Journal of Membrane Science 281:70-87, 2006.
Cath et al., "A multi-barrier osmotic dilution process for simultaneous desalination and purification of impaired water," Journal of Membrane Science 362:417-426, 2010.
Chou et al., "Characteristics and potential applications of a novel forward osmosis hollow fiber membrane," Desalination 261:365-372, 2010.
Cornelissen et al., "Membrane fouling and process performance of forward osmosis membranes on activated sludge," Journal of Membrane Science 319:158-168, 2008.
Dova et al., "On the direct osmotic concentration of liquid foods. Part I: Impact of process parameters on process performance," Journal of Food Engineering 78:422-430, 2010.
Dova et al., "On the direct osmotic concentration of liquid foods: Part II. Development of a generalized model," Journal of Food Engineering 78:431-437, 2005.
Eckenhoff et al., "The osmotic pump: novel research tool for optimizing drug regimens," Biomaterials, 2:89-97, Apr. 1981.
Elimelech, "Yale constructs forward osmosis desalination pilot plant," Membrane Technology:7-8, 2007.
Garcia-Castello et al.,"Performance evaluation of sucrose concentration using forward osmosis," Journal of Membrane Science 338:61-66, 2011.

(56) References Cited

OTHER PUBLICATIONS

Guan et al., "A novel gastric-resident osmotic pump tablet: In vitro and in vivo evaluation," International Journal of Pharmaceutics 383:30-36, 2009.
Holloway et al., "Forward osmosis for concentration of anaerobic digester centrate," Water Research 41:4005-4014, 2007.
Jin et al., "Boric Acid Permeation in Forward Osmosis Membrane Processes: Modeling, Experiments, and Implications," Environmental Science and Technology 45:2323-2330, 2011.
Kessler et al., "Drinking Water From Sea Water by Forward Osmosis," Desalination 18:297-306, 1976.
Lay et al., "Fouling propensity of forward osmosis: investigation of the slower flux decline phenomenon," Water Science and Technology 61.4:927-928, 2010.
Lee et al.,"Membranes for Power Generation by Pressure-Retarded Osmosis," Journal of Membrane Science 8:141-171, 1981.
Loeb et al., "Effect of porous support fabric on osmosis through a Loeb-Sourirajan type asymmetric membrane," Journal of Membrane Science 129:243-249, 1997.
Martinetti et al., "High recovery of concentrated RO brines using forward osmosis and membrane distillation," Journal of Membrane Science 331:31-39, 2009.
McCutcheon et al., "A novel ammonia-carbon dioxide forward (direct) osmosis desalination process," Desalination 174:1-11, 2004.
McCutcheon et al., "Influence of concentrative and dilutive internal concentration polarization on flux behavior in forward osmosis," Journal of Membrane Science 284:237-247, 2006.
McCutcheon et al., "Influence of membrane support layer hydrophobicity on water flux in osmotically driven membrane processes," Journal of Membrane Science 318:458-466, 2008.
McGinnis et al.,"Energy requirements of ammonia-carbon dioxide forward osmosis desalination," Desalination 207:370-382, 2006.
Mi et al., "Organic fouling of forward osmosis membranes: Fouling reversibility and cleaning without chemical reagents," Journal of Membrane Science 348:337-345, 2011.
Ng et al., "Performance of Forward (Direct) Osmosis Process: Membrane Structure and Transport Phenomenon," Environmental Science and Technology 40(7):2408-2413, 2006.
Petersen, "Composite reverse osmosis and nanofiltration membranes," Journal of Membrane Science 83:81-50, 1993.
Setiawan et al., "Fabrication of novel poly(amide-imide) forward osmosis hollow fiber membranes with a positively charged nanofiltration-like selective layer," Journal of Membrane Science 369:196-205, 2011.
Shi et al.,"Effect of additives on the fabrication of poly (vinylidene fluoride-co-hexafluropropylene) (PVDF-HFP) asymmetric microporous hollow fiber membranes," Journal of Membrane Science 315:195-204, 2008.
Su et al., "Cellulose acetate nanofiltration hollow fiber membranes for forward osmosis processes," Journal of Membrane Science 355:36-44, 2010.
Sukitpaneenit et al., "Molecular elucidation of morphology and mechanical properties of PVDF hollow fiber membranes from aspects of phase inversion, crystallization and rheology," Journal of Membrane Science 340:192-205, 2009.
Tang et al., "Probing the nano- and micro-scales of reverse osmosis membranes—A comprehensive characterization of physiochemical properties of uncoated and coated membranes by XPS, TEM, ATR-FTIR, and streaming potential measurements," Journal of Membrane Science 287:146-156, 2006.
Tang et al., "Characterization of Humic Acid Fouled Reverse Osmosis and Nanofiltration Membranes by Transmission Electron Microscopy and Streaming Potential Measurements," Environmental Science and Technology 41(3):942-949, 2006.
Tang et al., "Effect of Flux (Transmembrane Pressure) and Membrane Properties on Fouling and Rejection of Reverse Osmosis and Nanofiltration Membranes Treating Perfluorooctane Sulfonate Containing Wastewater," Environmental Science and Technology 41(6):2008-2014, 2007.
Tang et al., "Effect of membrane chemistry and coating layer on physiochemical properties of thin film composite polyamide RO and NF membranes II. Membrane physiochemical properties and their dependence on polyamide and coating layers," Desalination 242:168-182, 2008.
Tang et al., "Coupled effects of internal concentration polarization and fouling flux behavior of forward osmosis membranes during humic acid filtration," Journal of Membrane Science 354:123-133, 2010.
Tiraferri et al., "Relating performance of thin-film composite forward osmosis membranes to support layer formation and structure," Journal of Membrane Science 367:340-352, 2011.
Wang et al., "Polybenzimidazole (PBI) nanofiltration hollow fiber membranes applied in forward osmosis process," Journal of Membrane Science 300:6-12, 2007.
Wang et al., "Enhanced forward osmosis from chemically modified polybenzimidazole (PBI) nanofiltration hollow fiber membranes with a thin wall," Chemical Engineering Science 64:1577-1584, 2008.
Wang et al., "Characterization of novel forward osmosis hollow fiber membranes," Journal of Membrane Science 355:158-167, 2010.
Wang et al.,"Double-Skinned Forward Osmosis Membranes for Reducing Internal Concentration Polarization within the Porous Sublayer," Industrial and Engineering Chemistry Research 49:4824-4831, 2010.
Wang et al., "Direct Microscopic Observation of Forward Osmosis Membrane Fouling," Environmental Science and Technology 44(18):7102-7109, 2010.
Xiao et al., "Modeling salt accumulation in osmotic membrane bioreactors: Implications for FO membrane selection and system operation," Journal of Membrane Science 366:314-324, 2010.
Xu et al., "Effect of draw solution concentration and operating conditions on forward osmosis and pressure retarded osmosis performance in a spiral wound module," Journal of Membrane Science 348:298-309, 2009.
Yang et al., "Dual-Layer Hollow Fibers with Enhanced Flux as Novel Forward Osmosis Membranes for Water Production," Environmental Science and Technology 43(8):2800-2805, 2009.
Yang et al., "A novel dual-layer forward osmosis membrane for protein enrichment and concentration," Separation and Purification Technology 69:269-274, 2009.
Yin et al., "High Performance Thin-Film Composite Forward Osmosis Membrane," Environmental Science and Technology 44(10):3812-3818, 2010.
Zhang et al., "Well-constructed cellulose acetate membranes for forward osmosis: Minimized internal concentration polarization with an ultra-thin selective layer," Journal of Membrane Science 360:522-535, 2010.
Zou et al., "The role of physical and chemical parameters on forward osmosis membrane fouling during algae separation," Journal of Membrane Science, 366:356-362, 2010.

\* cited by examiner

Table 1 Synthesis conditions for TFC FO membranes

| Membrane ID | Substrate via phase inversion | | | | | Rejection layer via interfacial polymerization [a] | | | |
|---|---|---|---|---|---|---|---|---|---|
| | PSf (wt.%) | NMP (wt.%) | PVP (wt.%) | LiCl (wt.%) | Thickness of casting solution ($\mu$m) | MPD (wt.%) | SDS (wt.%) | Water (wt.%) | TMC in n-hexane (wt/v.%) |
| TFC-1 | 17.5 | 82.0 | 0.5 | - | 175 | 1.0 | - | 99.0 | 0.05 |
| TFC-2 | 15.5 | 81.0 | 0.5 | 3.0 | 150 | 1.5 | 0.1 | 98.4 | 0.1 |

(a)

FIG. 2 (CONT.)
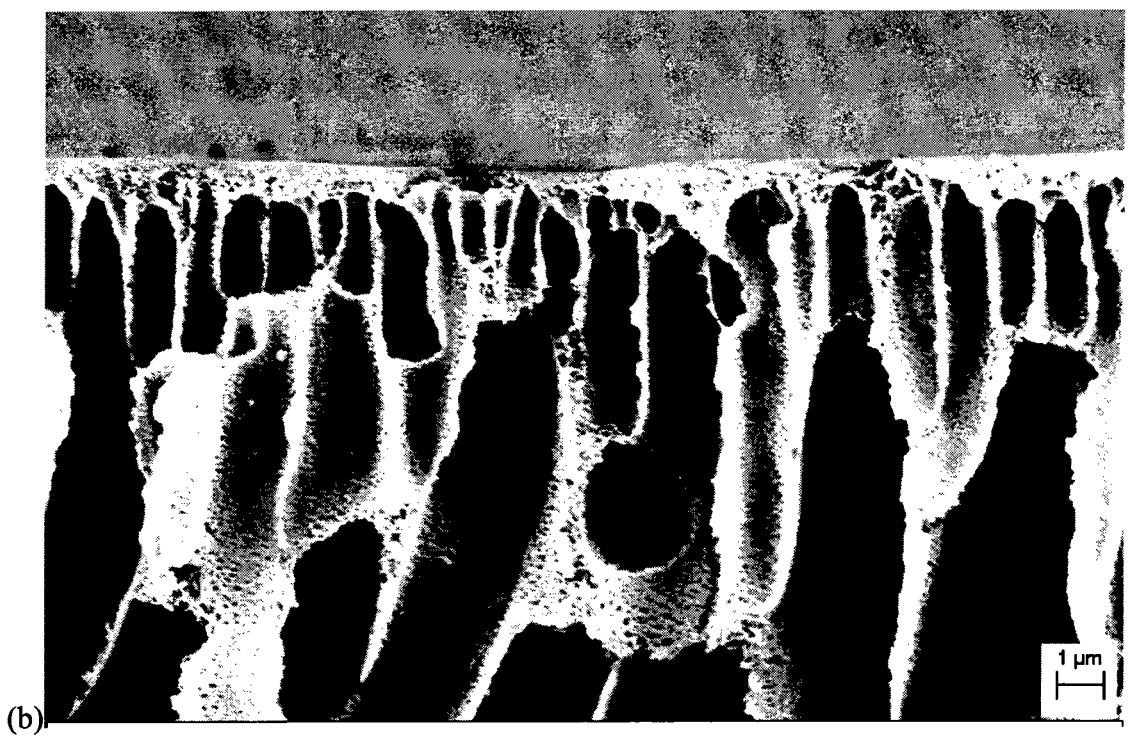
(b)
(c)

(d)

(a)

FIG. 3 (CONT.)
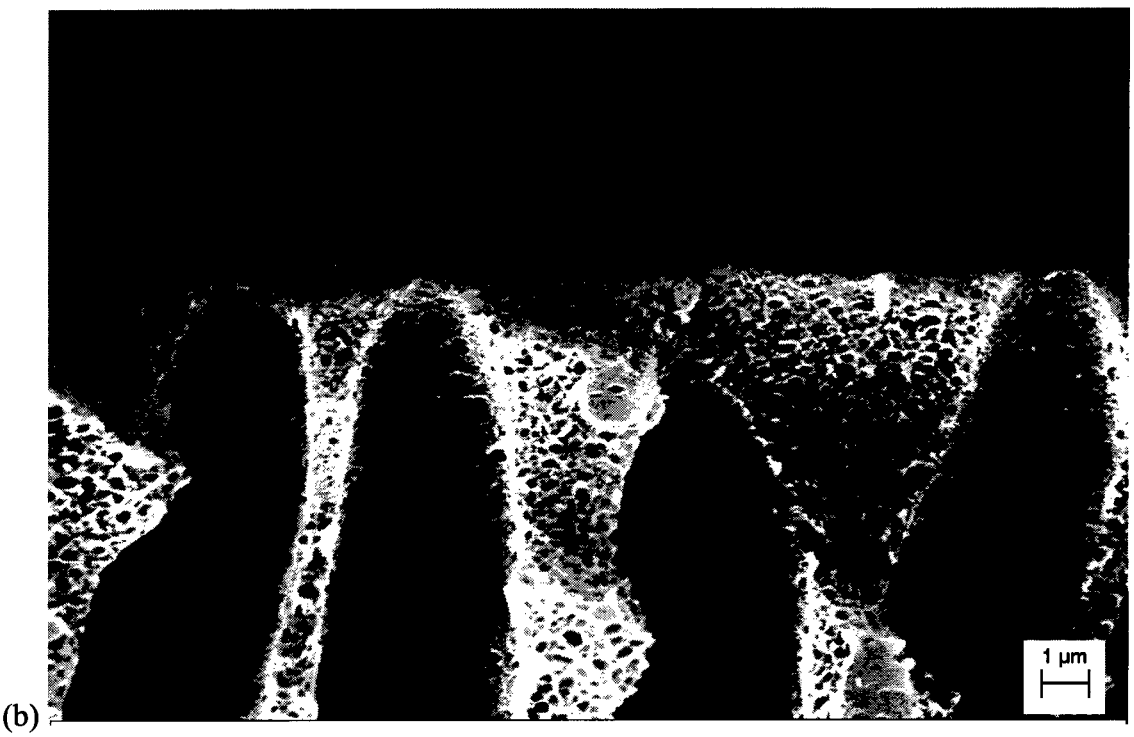
(b)
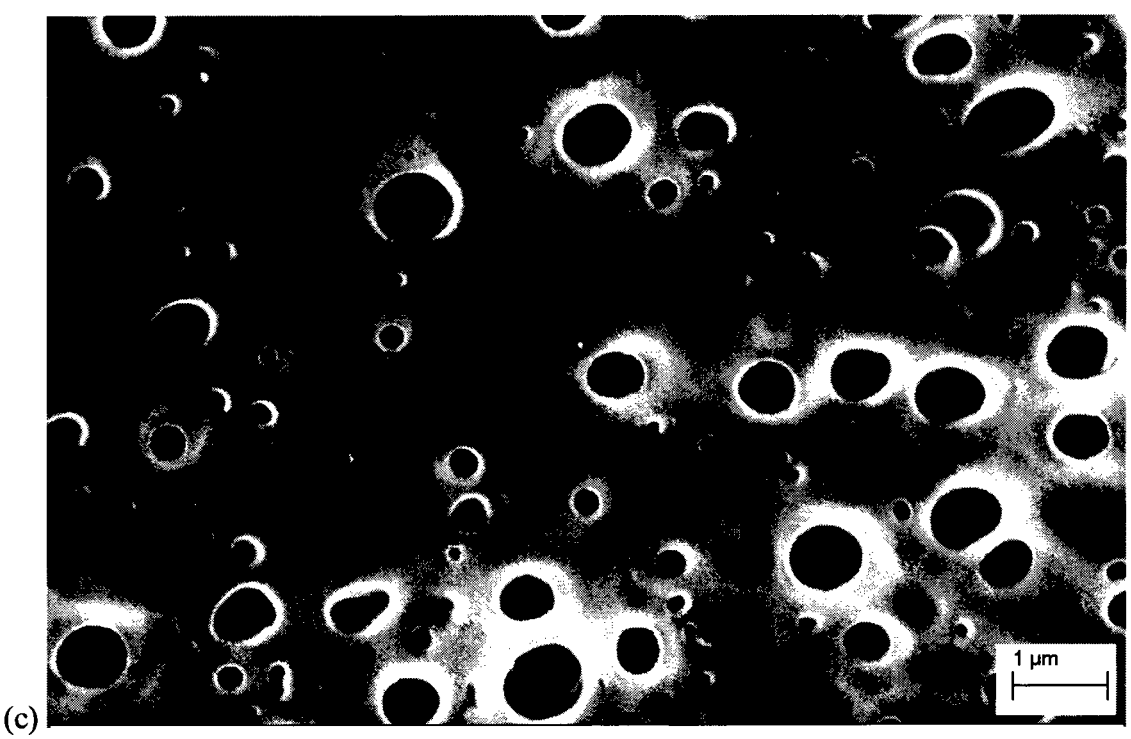
(c)

(d)

Table 2 Characteristics of FO membrane substrates [a]

| Sample | Thickness [c] (μm) | Porosity [d] (%) | $s$ value [e] (mm) | Pure water flux [f] (L/m².h) | Contact angle (°) |
|---|---|---|---|---|---|
| S-1 (TFC-1) | 76.1 ± 3.0 | 77 ± 3 | 0.71 ± 0.14 | 107 ± 10 | 56 ± 1 |
| S-2 (TFC-2) | 72.8 ± 0.7 | 82 ± 2 | 0.67 ± 0.17 | 190 ± 15 | 53 ± 3 |
| CTA-HW [b] | 90.0 ± 6.0 (60 [b]) | 64 ± 1 | 0.72 ± 0.15 | - | 74 ± 2 [g] |
| CTA-W [b] | 44.7 ± 14.1 (20 [b]) | 46 ± 1 | 1.00 ± 0.54 | - | 69 ± 2 [g] |
| CTA-NW | 144 ± 24 | 50 ± 2 | 1.38 ± 0.26 | - | 74 ± 3 [h] |
| BW30 | 152 ± 4 | 35 ± 1 | 37.5 ± 19.6 | - | 92 ± 2 [i] |
| BW30-o | 58.1 ± 5.1 | 49 ± 1 | 14.0 ± 1.6 | - | 92 ± 2 [i] |

FIG. 5
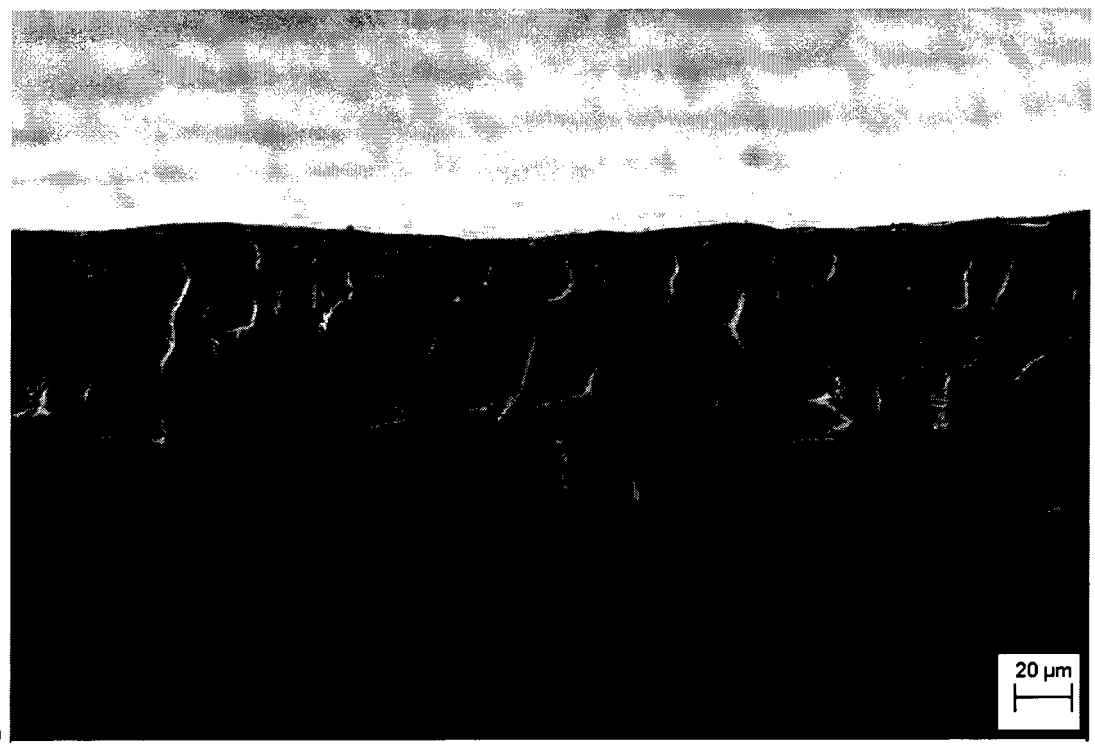
(a)
(b)

FIG. 5 (CONT.)
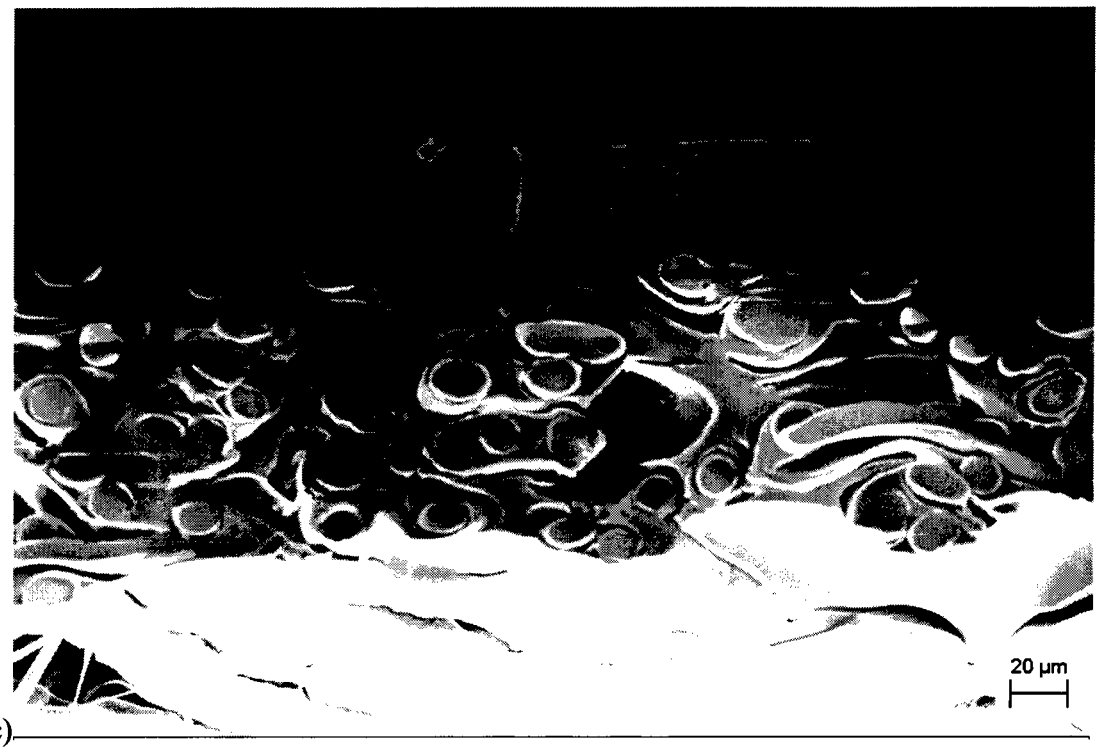
(c)
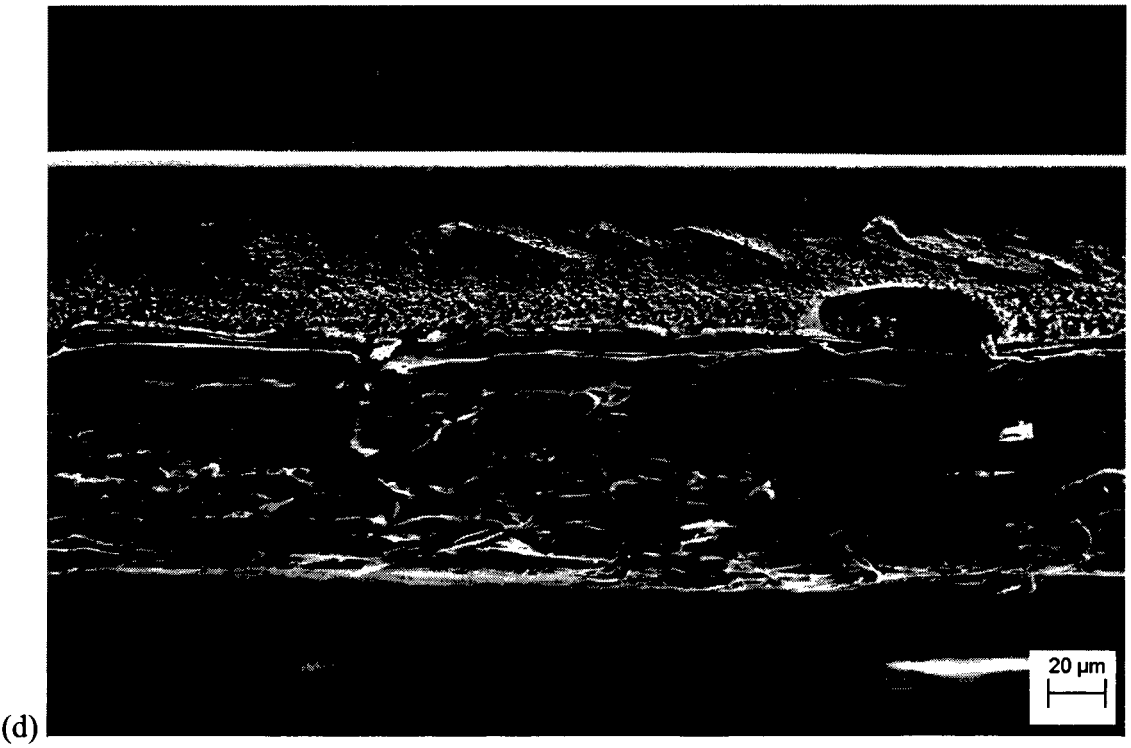
(d)

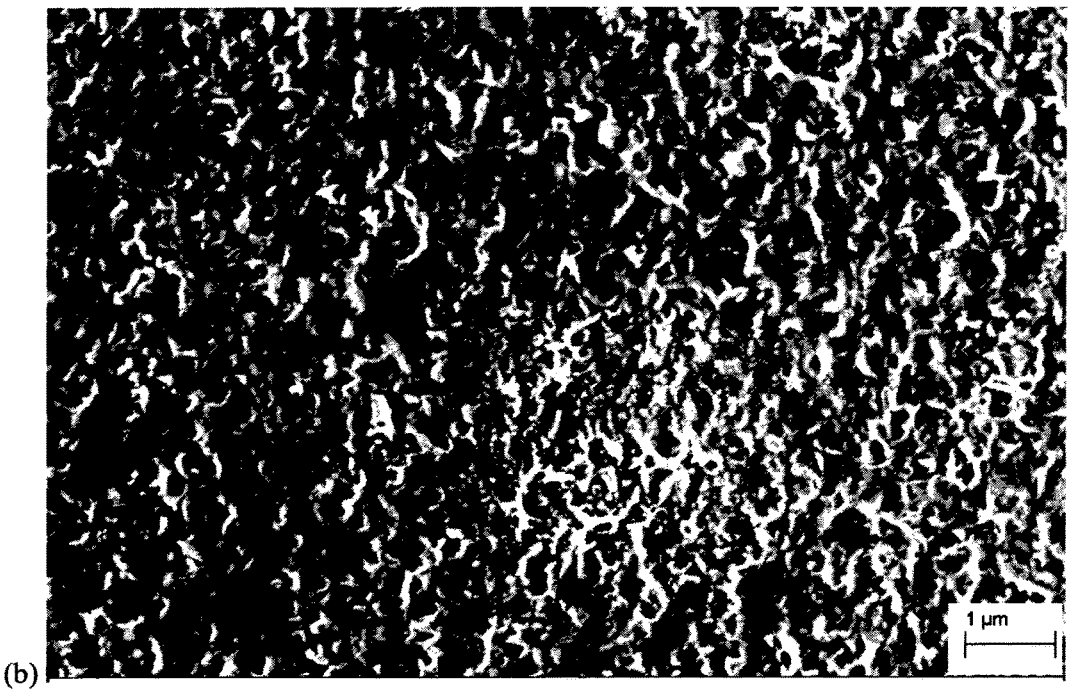

Table 3 Properties of synthesized TFC FO membranes and commercial membranes [a]

| Sample | Contact angle (°) | Surface morphology | Water permeability [b] | | NaCl rejection [c] (%) | Salt permeability $B$ [d] ($10^{-8}$ m/s) | $B/A$ [d] (kPa) |
|---|---|---|---|---|---|---|---|
| | | | (L/m².h.bar) | ($10^{-12}$ m/s.Pa) | | | |
| TFC-1 | 43 ± 4 | Ridge-valley | 1.15 ± 0.16 | 3.2 ± 0.5 | 94.5 | 4.7 ± 1.4 | 16 ± 6 |
| TFC-2 | 45 ± 4 | Ridge-valley | 1.78 ± 0.23 | 5.0 ± 0.7 | 93.4 | 9.4 ± 1.9 | 20 ± 6 |
| CTA-HW | 63 ± 3 | Smooth | 1.19 ± 0.19 | 3.3 ± 0.5 | 78.5 | 25.6 ± 1.4 | 84 ± 8 |
| CTA-W | 73 ± 2 | Smooth | 0.33 ± 0.04 | 0.9 ± 0.1 | 81.9 | 4.0 ± 0.9 | 47 ± 12 |
| CTA-NW | 64 ± 2 | Smooth | 0.46 ± 0.07 | 1.3 ± 0.2 | 92.4 | 2.7 ± 0.2 | 22 ± 3 |
| BW30 | 42 ± 2 | Ridge-valley | 3.04 ± 0.44 | 8.4 ± 1.2 | 92.2 | 18.9 ± 1.4 | 24 ± 3 |
| BW30-o | 42 ± 2 | Ridge-valley | 2.79 ± 0.40 | 7.8 ± 1.1 | 86.9 | 33.4 ± 4.3 | 47 ± 9 |

Table 4 FO water flux of synthesized TFC FO membranes and commercial membranes

| Membrane orientation | AL-DS | | AL-FS | |
|---|---|---|---|---|
| DS concentration | 0.5 M | 2.0 M | 0.5 M | 2.0 M |
| TFC-1 | 18.1 | 44.8 | 9.53 | 18.1 |
| TFC-1 (replicate) | 16.5 | 37.8 | 9.01 | 16.7 |
| TFC-2 | 20.5 | 54.3 | 12.0 | 22.2 |
| TFC-2 (replicate) | 19.5 | 53.1 | 14.9 | 27.9 |
| CTA-HW | 15.4 | 35.9 | 9.03 | 18.3 |
| CTA-W | 6.55 | 22.9 | 5.00 | 12.1 |
| CTA-NW | 8.19 | 21.8 | 4.42 | 8.54 |
| BW30 | 0.44 | 1.59 | 0.78 | 0.48 |
| BW30-o | 1.33 | 2.18 | 1.09 | 1.90 |

FIG. 10
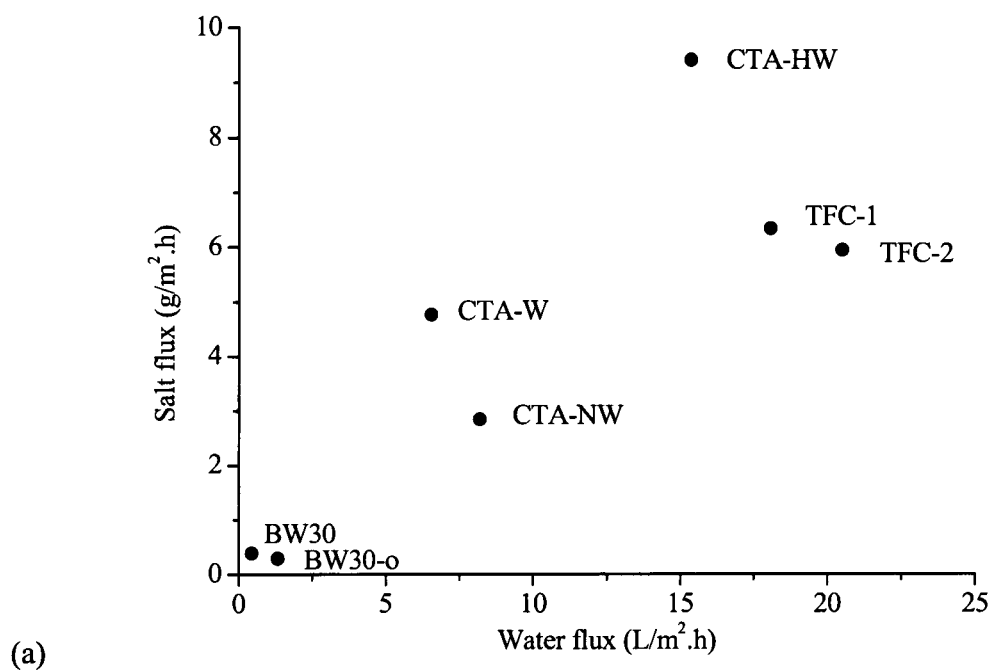
(a)
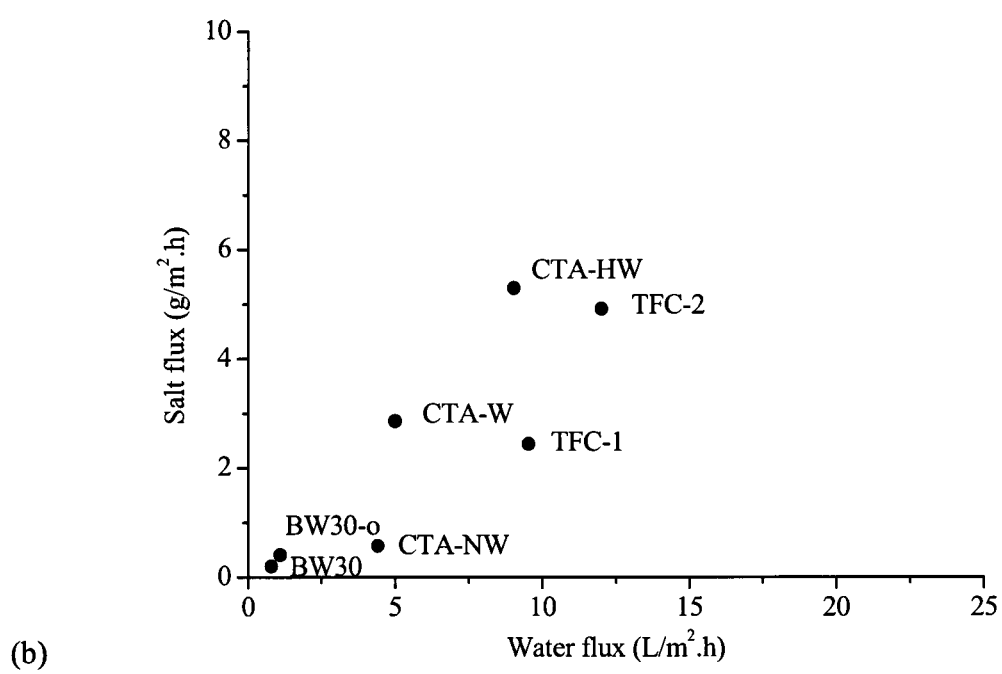
(b)

FIG. 11

Table 5 Comparison of FO performance with literature data

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| TFC flat-sheet membrane | Polyamide-polysulfone | 18.1 | 6.3 | AL-DS | 10 mM NaCl | 0.5 M NaCl | 23 | Present work |
| | | 9.5 | 2.4 | AL-FS | 10 mM NaCl | 0.5 M NaCl | 23 | Present work |
| TFC flat-sheet membrane | Polyamide-polysulfone | 20.5 | 5.9 | AL-DS | 10 mM NaCl | 0.5 M NaCl | 23 | Present work |
| | | 12 | 4.9 | AL-FS | 10 mM NaCl | 0.5 M NaCl | 23 | Present work |
| Commercial asymmetric flat-sheet membrane (CTA-HW) | Cellulose triacetate | 15.4 | 9.4 | AL-DS | 10 mM NaCl | 0.5 M NaCl | 23 | Present work |
| | | 9 | 5.3 | AL-FS | 10 mM NaCl | 0.5 M NaCl | 23 | Present work |

FIG. 11 (CONT.)

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| Commercial asymmetric flat-sheet membrane (CTA-W) | Cellulose triacetate | 6.6 | 4.8 | AL-DS | 10 mM NaCl | 0.5 M NaCl | 23 | Present work |
| | Cellulose triacetate | 5 | 2.9 | AL-FS | 10 mM NaCl | 0.5 M NaCl | 23 | Present work |
| Commercial asymmetric flat-sheet membrane (CTA-NW) | Cellulose triacetate | 8.2 | 2.8 | AL-DS | 10 mM NaCl | 0.5 M NaCl | 23 | Present work |
| | | 4.4 | 0.6 | AL-FS | 10 mM NaCl | 0.5 M NaCl | 23 | Present work |
| TFC flat-sheet membrane | Polyamide-polysulfone | 18.16 ± 0.96 | - | AL-FS | DI water | 1.5 M NaCl | 25 ± 0.5 | [29] |
| TFC flat-sheet membrane | Polyamide-polysulfone | 20.5 ± 3.8 | - | AL-FS | DI water | 1.0 M NaCl | 25 ± 0.5 | [37] |
| TFC flat-sheet membrane | Polyamide-polysulfone | 13.9 ± 1.0 | - | AL-FS | DI water | 1.0 M NaCl | 25 ± 0.5 | [37] |

FIG. 11 (CONT.)

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| TFC flat-sheet membrane | Polyamide-polysulfone | 9.2 ± 0.2 | - | AL-FS | DI water | 1.0 M NaCl | 25 ± 0.5 | [37] |
| TFC flat-sheet membrane | Polyamide-polysulfone | 6.2 ± 2.8 | - | AL-FS | DI water | 1.0 M NaCl | 25 ± 0.5 | [37] |
| TFC flat-sheet membrane | Polyamide-polysulfone | 10.8 ± 2.4 | - | AL-FS | DI water | 1.0 M NaCl | 25 ± 0.5 | [37] |
| TFC flat-sheet membrane | Polyamide-polysulfone | 12.5 ± 1.0 | - | AL-FS | DI water | 1.0 M NaCl | 25 ± 0.5 | [37] |
| TFC flat-sheet membrane | Polyamide-polysulfone | 14.3 ± 2.5 | - | AL-FS | DI water | 1.0 M NaCl | 25 ± 0.5 | [37] |
| TFC flat-sheet membrane | Polyamide-polysulfone | 25.0 ± 4.1 | - | AL-FS | DI water | 1.0 M NaCl | 25 ± 0.5 | [37] |
| TFC flat-sheet membrane | Polyamide-polysulfone | 17.6 ± 0.4 | - | AL-FS | DI water | 1.0 M NaCl | 25 ± 0.5 | [37] |
| TFC flat-sheet membrane | Polyamide-polysulfone | 5.6 ± 1.6 | - | AL-FS | DI water | 1.0 M NaCl | 25 ± 0.5 | [37] |

FIG. 11 (CONT.)

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| TFC flat-sheet membrane | Polyamide-polysulfone | 0.5 ± 0.1 | - | AL-FS | DI water | 1.0 M NaCl | 25 ± 0.5 | [37] |
| TFC flat-sheet membrane | Polyamide-polysulfone | 5.4 ± 0.6 | - | AL-FS | DI water | 1.0 M NaCl | 25 ± 0.5 | [37] |
| TFC flat-sheet membrane | Polyamide-polysulfone | 5.6 | - | AL-FS | DI water | 1.0 M NaCl | 25 ± 0.5 | [37] |
| Double-skinned flat-sheet membrane | Cellulose acetate | 48.2 | 6.5 | MgCl₂-Bottom | DI water | 5.0 M MgCl₂ | 22 ± 0.5 | [28] |
| | | 27.4 | 3.9 | MgCl₂-Top | DI water | 5.0 M MgCl₂ | 22 ± 0.5 | [28] |
| Double-skinned flat-sheet membrane | Cellulose acetate | 17.3 ± 0.4 | 1.2 ± 0.2 | AL-DS | DI water | 2.0 M MgCl₂ | 22 ± 0.5 | [34] |
| | | 10.3 ± 0.3 | 0.8 ± 0.1 | AL-FS | DI water | 2.0 M MgCl₂ | 22 ± 0.5 | [34] |

FIG. 11 (CONT.)

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| Double-skinned flat-sheet membrane | Cellulose acetate | 14.7 ± 1.0 | 2.2 ± 0.4 | AL-DS | DI water | 2.0 M MgCl$_2$ | 22 ± 0.5 | [34] |
| | | 9.8 ± 0.7 | 1.2 ± 0.3 | AL-FS | DI water | 2.0 M MgCl$_2$ | 22 ± 0.5 | [34] |
| Double-skinned flat-sheet membrane | Cellulose acetate | 9.5 ± 0.4 | 698.6 ± 14.8 | AL-DS | DI water | 2.0 M MgCl$_2$ | 22 ± 0.5 | [34] |
| | | 7.9 ± 0.5 | 824.8 ± 15.0 | AL-FS | DI water | 2.0 M MgCl$_2$ | 22 ± 0.5 | [34] |
| TFC hollow fiber | Polyamide-polyethersulfone | 12.9 | 5 | AL-DS | DI water | 0.5M NaCl | 23 | [46] |
| | | 5 | 2.12 | AL-FS | DI water | 0.5M NaCl | 23 | [46] |
| TFC hollow fiber | Polyamide-polyethersulfone | 32.2 | 3.5 | AL-DS | DI water | 0.5M NaCl | 23 | [46] |
| | | 14 | 1.75 | AL-FS | DI water | 0.5M NaCl | 23 | [46] |
| TFC hollow fiber | Polyamide-polyethersulfone | 32.9 | 2.9 | AL-DS | 500 ppm (8.6 mM) NaCl | 0.5M NaCl | 20 ~ 25 | [36] |
| Positively charged hollow fiber | Poly(amide-imide)-polyethyleneimine | 6.34 | 3 | AL-DS | DI water | 1.5 M MgCl$_2$ | 23 | [38] |
| | | 4.15 | 1.9 | AL-FS | DI water | 1.5 M MgCl$_2$ | 23 | [38] |

FIG. 11 (CONT.)

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| Positively charged hollow fiber | Poly(amide-imide)-polyethyleneimine | 17.3 | 16.6 | AL-DS | DI water | 1.5 M $MgCl_2$ | 23 | [38] |
| | | 11.7 | 3.9 | AL-FS | DI water | 1.5 M $MgCl_2$ | 23 | [38] |
| Positively charged hollow fiber | Poly(amide-imide)-polyethyleneimine | 17.2 | 37.7 | AL-DS | DI water | 1.5 M $MgCl_2$ | 23 | [38] |
| | | 12.9 | 4.8 | AL-FS | DI water | 1.5 M $MgCl_2$ | 23 | [38] |
| Asymmetric hollow fiber | Cellulose acetate | 7.3 | - | AL-DS | DI water | 2.0 M $MgCl_2$ | - | [27] |
| | | 5 | - | AL-FS | DI water | 2.0 M $MgCl_2$ | - | [27] |
| Asymmetric hollow fiber | Polybenzimidazole | 3.84 | - | AL-DS | DI water | 2.0 M NaCl | 22.5 | [30] |
| | | 5.65 | - | AL-DS | DI water | 2.0 M $MgSO_4$ | 22.5 | [30] |
| | | 7.74 | - | AL-DS | DI water | 2.0 M $Na_2SO_4$ | 22.5 | [30] |
| | | 9.02 | - | AL-DS | DI water | 2.0 M $MgCl_2$ | 22.5 | [30] |
| Asymmetric hollow fiber | Polybenzimidazole | 36.5 | - | AL-DS | DI water | 5.0 M $MgCl_2$ | 23 | [31] |
| Asymmetric hollow fiber | Polybenzimidazole | 32.4 | - | AL-DS | DI water | 5.0 M $MgCl_2$ | 23 | [31] |

FIG. 11 (CONT.)

| Structure | Material | FO performance | | | Testing conditions | | | References |
|---|---|---|---|---|---|---|---|---|
| | | Water flux (L/m².h) | Salt flux (g/m².h) | Membrane orientation | Feed solution | Draw solution | Temperature (°C) | |
| Dual-layer hollow fiber | polybenzimidazole-polyethersulfone/polyvinylpyrrolidone | 17.1 | - | AL-DS | 0.1 g/L lysozyme aqueous solution | 3.125 M MgCl$_2$ | - | [32] |
| | | 12.7 | - | AL-FS | 0.1 g/L lysozyme aqueous solution | 3.125 M MgCl$_2$ | - | [32] |
| Dual-layer hollow fiber | polybenzimidazole-polyethersulfone/ polyvinyl pyrrolidone | 24.2 | - | AL-FS | DI water | 5.0 M MgCl$_2$ | 23 | [33] |
| | | 33.8 | - | AL-DS | DI water | 5.0 M MgCl$_2$ | 23 | [33] |
| | | 45.6 | - | AL-DS | DI water | 5.0 M MgCl$_2$ | 38.5 | [33] |

FIG. 12
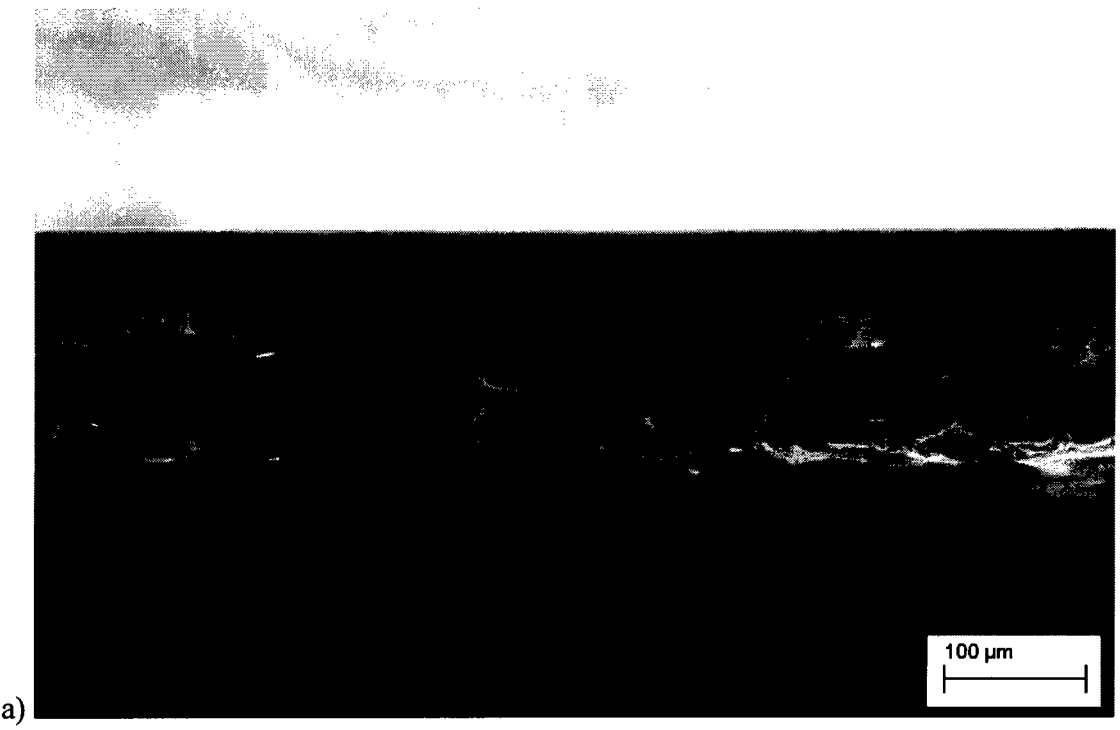
a)
b)

FIG. 13
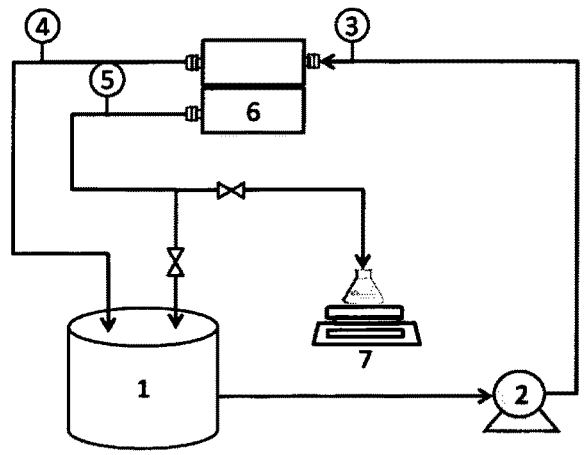
FIG. 14
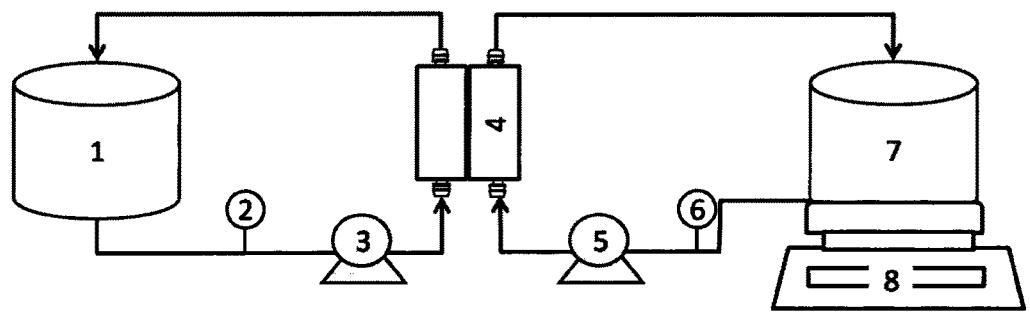
FIG. 15
Table 6 Characteristics of substrates prepared for TFC flat-sheet FO membranes
| | Description | Thickness ($\mu$m) | Contact angle (°) | Porosity (%) | Pure water flux (L/m$^2$.h.bar) | Mean flow pore diameter (nm) |
|---|---|---|---|---|---|---|
| 1 | Substrate without mesh | 67.95 | 49.01 | 77.20 | 205 | 75.3 |
| 2 | Substrate with mesh | 163 | 52.30 | 64.12 | 509 | 68.1 |

FIG. 16

Table 7 Intrinsic separation properties and FO performance of TFC flat-sheet FO membranes synthesized

| | Description | Water permeability ($10^{-12}$ m/s·Pa) | Salt permeability ($10^{-8}$ m/s) | Water flux (Draw: 0.5M NaCl) (L/m²·h) | | Water flux (Draw: 2.0M NaCl) (L/m²·h) | | Salt flux (Draw: 0.5M NaCl) (g/m²·h) | | Salt flux (Draw: 2.0M NaCl) (g/m²·h) | |
|---|---|---|---|---|---|---|---|---|---|---|---|
| | | | | AL-DS | AL-FW | AL-DS | AL-FW | AL-DS | AL-FW | AL-DS | AL-FW |
| 1 | FO membrane without mesh | 6.57 | 3.78 | 20.50 | 12.00 | 54.29 | 22.18 | 5.93 | 4.91 | 19.59 | 30.68 |
| 2 | FO membrane with mesh | 2.49 | 16.20 | 5.89 | 4.34 | 14.45 | 5.81 | 2.64 | 1.12 | 2.32 | 2.67 |

FIG. 17

FORWARD OSMOSIS MEMBRANE AND METHOD OF FORMING A FORWARD OSMOSIS MEMBRANE

CROSS-REFERENCE TO RELATED APPLICATIONS

This application makes reference to and claims the benefit of priority of an application for "Synthesis of Thin Film Composite Flat-sheet Forward Osmosis Membranes" filed on Jan. 25, 2011, with the U.S. Patent and Trademark Office, and there duly assigned Ser. No. 61/435,959. The content of said application filed on Jan. 25, 2011, is incorporated herein by reference in its entirety for all purposes.

TECHNICAL FIELD

The invention relates to a method of forming a forward osmosis membrane, in particular, a thin film composite flat-sheet forward osmosis membrane. The invention also relates to a forward osmosis membrane.

BACKGROUND

Forward osmosis (FO), also referred to as osmosis or direct osmosis, is a natural phenomenon, which can be defined as the net movement of water molecules across a semi-permeable membrane from a less concentrated solution to a more concentrated solution. In forward osmosis, a semi-permeable membrane separates a hypotonic solution (feed solution) and a hypertonic solution (draw solution). In use, the semi-permeable membrane prevents the passage of solute molecules and ions through the membrane while allowing water molecules to pass through it.

Using osmotic pressure difference across the membrane instead of hydraulic pressure or temperature as a driving force, separation of water and solute can be carried out in a much more energy efficient manner. The membrane fouling propensity is also much lower as compared to pressure-driven membrane processes, such as reverse osmosis (RO). Furthermore, as high temperature and pressure are not required, forward osmosis is ideal for sensitive applications such as those found in the food and pharmaceutical industry. In addition to the afore-mentioned, forward osmosis can be employed efficiently and economically in application areas such as water purification, wastewater treatment, seawater desalination, and power generation.

The membrane is one of the key elements in forward osmosis technology. An example of a membrane designed for forward osmosis is an asymmetric cellulosic membrane developed by Hydration Technology Innovations (HTI, Albany, OR). The asymmetric cellulosic membrane comprises a skin layer for salt rejection and a porous scaffold layer having a woven or non-woven mesh embedded within or bonded to it as support. The scaffold of the commercial membrane is made from the same polymeric material as the skin layer, such as cellulose acetate (CA). Disadvantages of this type of material include sensitivity to thermal, chemical and biological degradation and low water permeability.

Various research groups have reported on the use of hollow fiber membranes in forward osmosis technology. For example, membranes such as asymmetric polybenzimidazole (PBI) hollow fibers, dual-layer polybenzimidazole-polyethersulfone/polyvinylpyrrolidone (PBI-PES/PVP) hollow fibers, asymmetric CA hollow fibers, and double-skinned CA flat-sheet membranes have been fabricated for forward osmosis process. These membranes exhibited reasonable rejection towards divalent salt such as magnesium chloride ($MgCl_2$). However, they exhibit limitations, such as inferior rejection to monovalent salts, for example, sodium chloride (NaCl), and low water permeability, which translates into insufficient levels of water flux and limitations in draw solution under forward osmosis conditions.

Some research groups have also attempted the use of reverse osmosis membranes, which possess high water permeability and high salt rejection, in forward osmosis processes. However, these membranes perform poorly under forward osmosis conditions due to the unsuitable membrane substructure. The reverse osmosis membrane has a substrate combining a sponge-like polymeric layer and a thick non-woven fabric, both of which provide sufficient mechanical strength under high pressure conditions in reverse osmosis. However, this type of structure increases the membrane thickness and reduces the membrane porosity. In forward osmosis, mass diffusion between bulk solution and the interior surface of selective layer will be greatly hindered by this substrate. As a result, effective driving force, i.e. osmotic pressure difference across the selective layer, is dramatically reduced. This phenomenon is referred to as internal concentration polarization (ICP), and results in a water flux value that is much lower than its theoretical value.

In view of the above, there is a need for an improved membrane for forward osmosis.

SUMMARY OF THE INVENTION

In a first aspect, the present invention refers to a method of forming a forward osmosis membrane having a porous substrate and a rejection layer. The method comprises
 a) forming a thin film of a polymer solution on a suitable substrate, wherein the polymer solution comprises at least one polymer and optionally one or more additives in a suitable solvent;
 b) immersing the thin film in a coagulant bath to form the porous substrate; and
 c) forming a rejection layer on the porous substrate.

In a second aspect, the present invention refers to a forward osmosis membrane. The forward osmosis membrane comprises a woven mesh, a porous substrate bonded to the woven mesh, and a rejection layer formed on the porous substrate.

In a third aspect, the present invention refers to a forward osmosis membrane formed by a method according to the first aspect.

In a fourth aspect, the present invention refers to use of the forward osmosis membrane according to the second aspect or the third aspect in a forward osmosis process.

BRIEF DESCRIPTION OF THE DRAWINGS

The invention will be better understood with reference to the detailed description when considered in conjunction with the non-limiting examples and the accompanying drawings, in which.

Notations a to i in the table represent the following:
a: The experimental errors are reported as the standard deviation of at least 3 repeated measurements.
b: The cross-sections of CTA-HW and CTA-W are non-uniform due to their woven support. The thickness values given in parentheses are the minimum cross-sectional thickness at the thinnest part of cross-section.
c: The thickness measured for the commercial forward osmosis and reverse osmosis membranes includes the contribution from the rejection layer. The polyamide rejection layer for BW30 has a thickness on the order of 200 nm. The thickness of the skin layer for CTA-HW, CTA-W, and CTA-NW are on the order of a few micrometers (refer to FIG. 5).
d: The porosity values shall be taken as nominal values since the membranes may be slightly swelled by water during the measurements. In addition, for measuring the porosity of the commercial forward osmosis and reverse osmosis membranes, the rejection layers were not removed.
e: Determined from forward osmosis water flux results using Equations (8) and (9).
f: Tested at an applied pressure of 1 bar.
g: Measured for the bottom surface of membranes.
h: Measured for the bottom surface of cellulose triacetate layer after the removal of the non-woven fabric.
i: Measured for the polysulfone substrate after the removal of the non-woven fabric layer.

Figure 5:
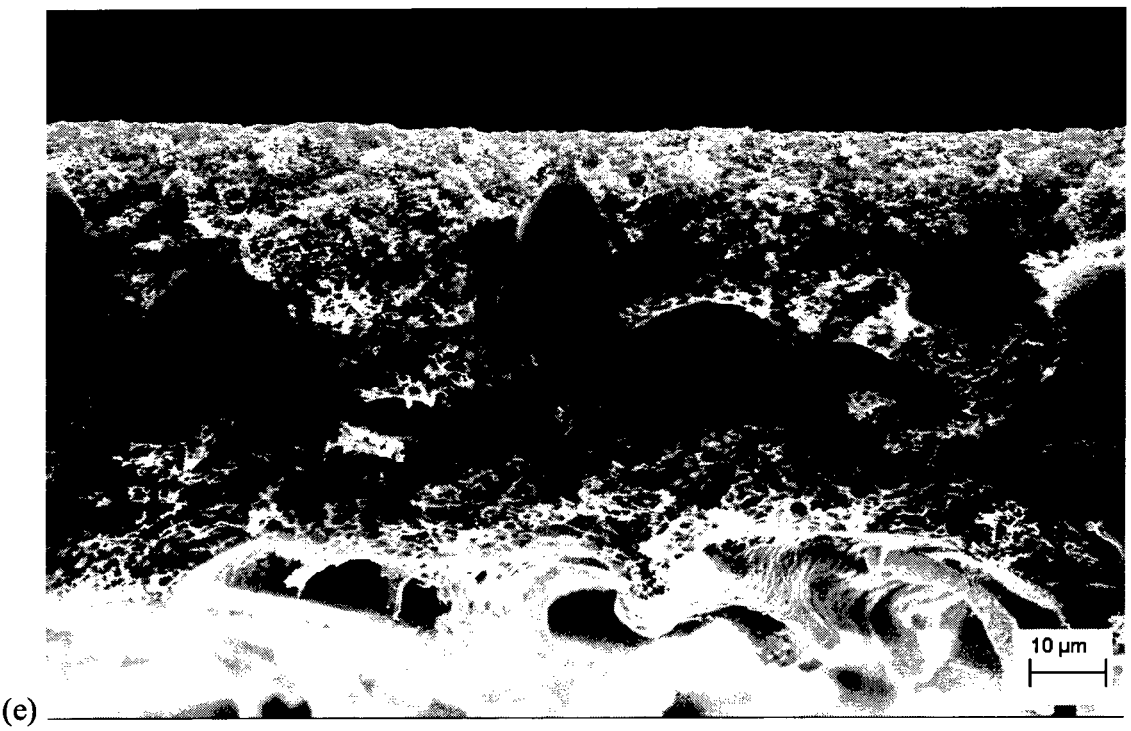

FIG. 5 are scanning electron microscope (SEM) cross-sectional micrographs of commercial forward osmosis and reverse osmosis membranes. (a) CTA-HW forward osmosis membrane, (b) CTA-W forward osmosis membrane, (c) CTA-NW forward osmosis membrane, (d) BW30 reverse osmosis membrane, and (e) BW30 membrane without reinforcing fabric (BW30-o). Slightly different magnifications have been used for different membranes in order to show both the overall membrane structure as well as the fine features of membrane pores. This does not affect the interpretation of the results. Scale bar in (a) to (d) denotes 20 μm. Scale bar in (e) denotes 10 μm.

Figure 6:
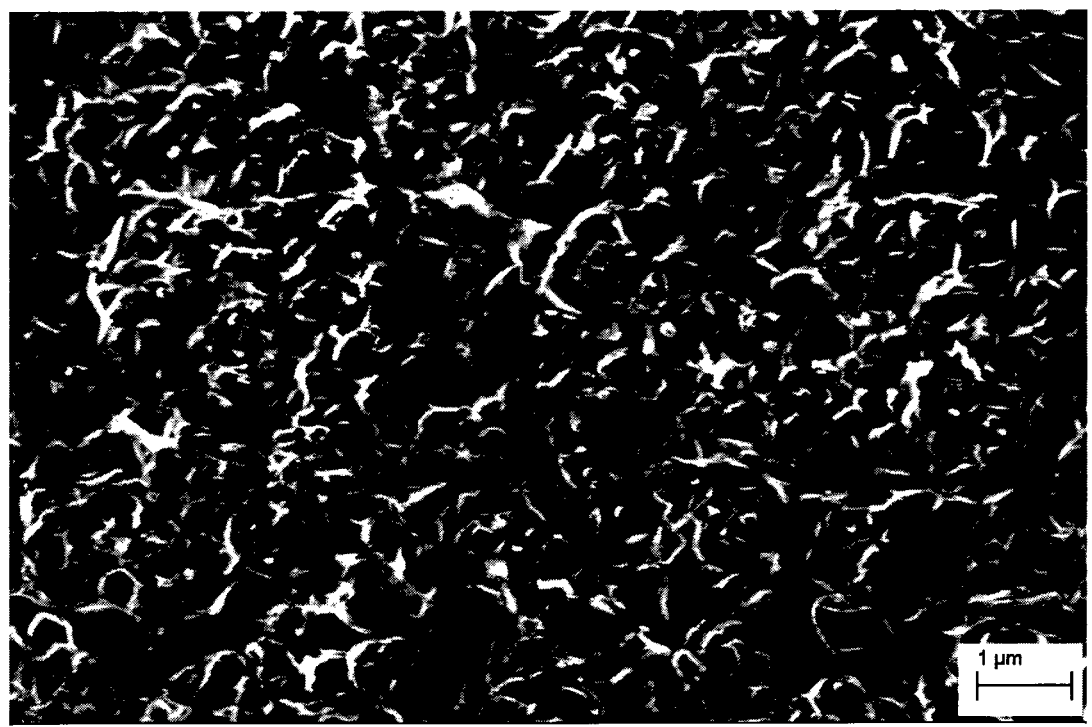

FIG. 6 are scanning electron microscope (SEM) micrographs of polyamide rejection layers. (a) TFC-1 and (b) TFC-2. Scale bar in (a) and (b) denotes 1 μm.

FIG. 7 is a table ('Table 3') summarizing the properties of synthesized thin film composite forward osmosis membranes and commercial membranes. Notations a to d used in the table represent the following:
a: The experimental errors are reported as the standard deviation of at least 3 repeated measurements.
b: Evaluated in the reverse osmosis testing mode over an applied pressure range of 1 to 5 bar with ultrapure water as feed water.
c: Evaluated in the reverse osmosis testing mode at 3.75 bar with 20 mM sodium chloride as feed.
d: Evaluated in the reverse osmosis testing mode over an applied pressure range of 1 to 5 bar for a feed water containing 20 mM sodium chloride.

Figures 8, 9:
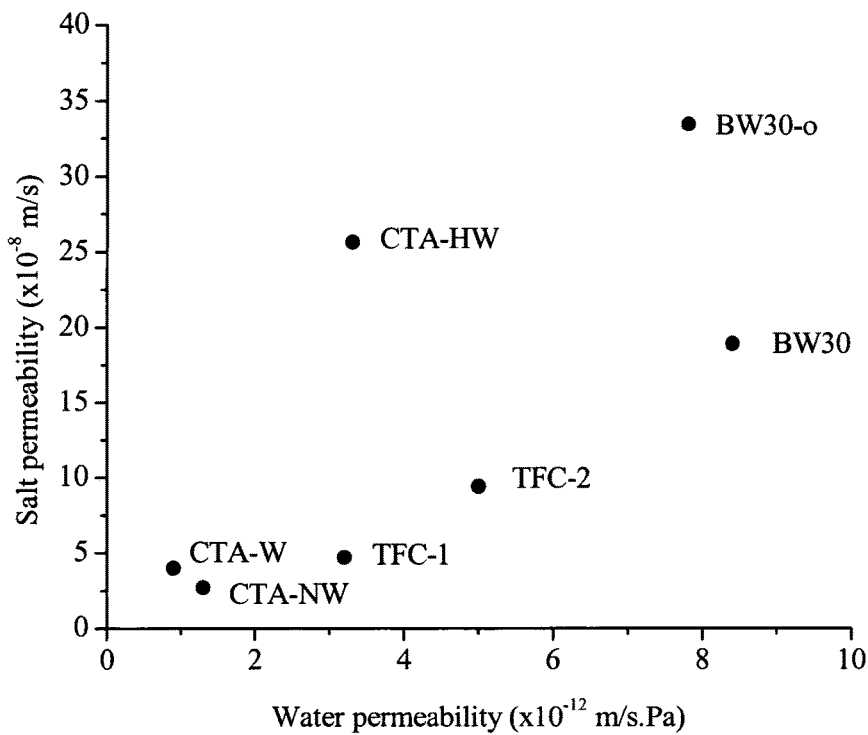

FIG. 8 is a graph depicting salt permeability versus water permeability for the synthesized thin film composite forward osmosis membranes and commercial membranes.

FIG. 9 is a table ('Table 4') summarizing the forward osmosis water flux of synthesized thin film composite forward osmosis membranes and commercial membranes. Testing conditions—draw solution: 0.5 or 2.0 M sodium chloride; feed solution: 10 mM sodium chloride. Forward osmosis water flux is reported in units of $L/m^2$ h.

FIG. 10 are graphs depicting forward osmosis water flux and solute flux for synthesized thin film composite forward osmosis membranes and commercial membranes. Testing conditions: 10 mM sodium chloride as feed solution, 0.5 M sodium chloride as draw solution, with both membrane orientations: (a) AL-DS and (b) AL-FS.

FIG. 11 is a comparison table ('Table 5') summarizing the forward osmosis performance with literature data.

FIG. 12 are SEM micrographs of the cross-section of thin film composite flat-sheet forward osmosis membranes synthesized (a) with reinforcing mesh, (b) without mesh in the support layer. The images were taken by a Zeiss Evo 50 Scanning Electron Microscope.

FIG. 13 is a schematic diagram of a cross-flow reverse osmosis setup for measuring intrinsic separation performance of membrane according to various embodiments of the present invention. The following notations were used in the diagram (1) Feed tank. (2) Pump. (3)(4)(5) Pressure transducers for feed, retentate and permeate, respectively. (6) Membrane cell. (7) Balance.

FIG. 14 is a schematic diagram of a cross-flow forward osmosis setup for membrane testing according to various embodiments of the present invention. The following notations were used in the diagram (1) Draw solution tank. (2)(6) Conductivity meters. (3)(5) Pumps. (4) Membrane cell. (7) Feed solution tank. (8) Balance.

FIG. 15 is a table ('Table 6') summarizing the characteristics of substrates prepared for thin film composite flat-sheet forward osmosis membranes.

FIG. 16 is a table ('Table 7') summarizing the intrinsic separation properties and forward osmosis performance of thin film composite flat-sheet forward osmosis membranes synthesized.

FIG. 17 is cross-sectional SEM micrograph of a polysulfone substrate of which the casting solution containing additive lithium chloride (LiCl).

DETAILED DESCRIPTION OF THE INVENTION

The invention provides a method of forming a forward osmosis membrane. The forward osmosis membrane according to various embodiments of the invention comprises a porous substrate and a rejection layer. The porous substrate minimizes resistance to mass diffusion between the bulk solution and the interior surface of the rejection layer, which in turn minimizes reduction of effective osmotic pressure difference across the membrane caused by internal concentration polarization. In the meantime, the rejection layer on the porous substrate maintains a high level of permeability while acting as a highly selective layer for separation of components in forward osmosis. A woven mesh may optionally be included to impart higher mechanical strength to the membrane while maintaining a high level of flux through the membrane.

Accordingly, in a first aspect, the present invention refers to a method of forming a forward osmosis membrane having a porous substrate and a rejection layer. The method comprises a) forming a thin film of a polymer solution on a suitable substrate, wherein the polymer solution comprises at least one polymer and optionally one or more additives in a suitable solvent;
b) immersing the thin film in a coagulant bath to form the porous substrate; and
c) forming a rejection layer on the porous substrate.

As used herein, the term "membrane" refers to a semipermeable material that selectively allows certain species to pass through it while retaining others within or on the material. A membrane therefore functions like a filter medium to permit a component separation by selectively controlling passage of the components from one side of the membrane to the other side. Examples of membrane types include tubular membranes, hollow fiber membranes and flat-sheet membranes. Tubular membranes and hollow fiber membranes assume the form of hollow tubes of circular cross-section, whereby the wall of the tube functioning as the membrane. Flat-sheet membranes, on the other hand, are formed from one or more sheets of membrane material placed adjacent to or bonded to one another.

The method of forming a forward osmosis membrane having a porous substrate and a rejection layer according to the present invention comprises forming a thin film of a polymer solution on a suitable substrate, wherein the polymer solution comprises at least one polymer and optionally one or more additives in a suitable solvent.

Generally, any polymer that can be used to form a membrane may be used. Examples of suitable polymers include, but are not limited to, polyarylether sulfones such as polysulfone (PSF) and polyether sulfone (PES), polyimides such as polyetherimide (PEI), polyacrylonitrile (PAN), polyvinylidene fluoride (PVDF), combination thereof or derivatives thereof. In some embodiments, the polymer is polysulfone.

The polymer is dissolved in a solvent to form a polymer solution. Any solvent that can be used to dissolve the polymer may generally be used. For example, the solvent may include, but are not limited to, 1-methyl-2-pyrrolidinone (NMP), dimethyl-acetamide (DMAc), dimethyl formamide (DMF), or their combination. In some embodiments, the solvent is 1-methyl-2-pyrrolidinone.

The concentration of polymer in the solution may be about 13 wt % to about 25 wt %, for example, about 13 wt % to about 20 wt %, or about 15 wt % to about 20 wt %. In some embodiments, polysulfone is dissolved in 1-methyl-2-pyrrolidinone to form a polymer solution having a concentration ranging from about 15.5 wt % to about 17.5 wt %.

Optionally, one or more additives are also dissolved in the solvent. In various embodiments, the additive may be a pore former. The pore former may be added to the polymer solution in order to form a porous substrate. In some embodiments, it may be used to increase the porosity of the resultant porous substrate. Suitable pore formers include, but are not limited to, organic pore formers such as polyethylene glycol (PEG), polyvinylpyrrolidone (PVP), pluronic, alcohol (methanol, ethanol, iso-propanol, glycerol), acetone, and ethylene glycol, inorganic salt pore formers such as lithium chloride (LiCl), lithium bromide (LiBr), or $KClO_4$. In some embodiments, the additive comprises polyvinylpyrrolidone and lithium chloride. In one embodiment, the additive is polyvinylpyrrolidone.

The total concentration of additives in the solution may be about 0.1 wt % to about 5 wt %, such as about 0.3 wt % to about 3 wt %, or about 3 wt % to about 5 wt %. In some embodiments, polyvinylpyrrolidone, as a pore forming additive, is present in a polymer solution of polysulfone and 1-methyl-2-pyrrolidinone at a concentration of about 0.5 wt %. In one further embodiment, lithium chloride, as a second pore forming additive, is added to the polymer solution to form a polymer solution with a concentration of about 3 wt % lithium chloride and 0.5 wt % polyvinylpyrrolidone.

The polymer, and optionally the one or more additives, is dissolved in the solvent to form a polymer solution. The polymer solution formed may be homogeneous. By the term "homogeneous", it means that the solution is in a single phase. By using a homogeneous polymer solution, the resultant membrane that is formed may be at least substantially uniform in composition across the span of the membrane as well as in its cross-section, thereby exhibiting a substantially consistent component separation behavior and/or pressure difference across the membrane.

The method of the present invention includes forming a thin film on a suitable substrate using the polymer solution. The thin film may be formed using any suitable thin film forming method, such as chemical vapor deposition, sol gel deposition, spin coating, screen printing, WebFlight method, tip coating, atomic layer deposition, and pulsed laser deposition. Generally, any suitable substrate having a surface upon which the polymeric thin film can be formed may be used. The substrate thus acts as a support for forming the thin film. The choice of a suitable substrate upon which the thin film is formed may depend on the type and concentration of polymer used, as well as the method of forming the thin film. In some embodiments, the polymer solution is coated on a clean glass plate to form a thin film. The thin film may have a thickness of about 50 μm to about 300 μm, such as about 100 μm to about 200 μm, about 150 μm to about 300 μm, or about 150 μm to about 200 μm.

The method of the invention comprises immersing the thin film in a coagulant bath to form the porous substrate. The coagulant bath may comprise a fluid that does not act as a solvent to the thin film. For example, the coagulant bath may comprise or consist of water when a non-polar solvent such as hexane is used. Alternatively, the coagulant bath may comprise a solvent, as discussed below. The coagulant bath may result in the formation of pores in the thin film, due to mass exchange of the solvent from the thin film with the non-solvent from the coagulant bath. For example, the non-solvent may permeate into the thin film with simultaneous out-flow of the solvent from the thin film until equilibrium is attained. As a result, a porous substrate is obtained. Accordingly, besides the concentration and type of pore formers used in the polymer solution, the size of pores in the porous substrate as well as its porosity may be controlled by changing, for example, the composition, temperature and immersion time of the thin film in the coagulant bath.

In alternate embodiments, a solvent is added to the coagulant bath in order to control precipitation rate of polymer and to obtain a desired membrane pore structure. The solvent that is added to the coagulant bath may be the same as that used to form the polymer solution. As discussed herein, examples of suitable solvents include, but are not limited to, 1-methyl-2-pyrrolidinone (NMP), dimethyl-acetamide (DMAc), dimethyl formamide (DMF), or their combination. The concentration of solvent in the coagulant bath may be about 0 wt %, i.e. a solvent is not added, to about 30 wt %, such as about 0 wt % to about 20 wt %, or about 0 wt % to about 10 wt %. Generally, the coagulant bath may be at any temperature suitable for forming the porous substrate. In one illustrated embodiment, the thin film is immersed in a coagulant bath containing water at room temperature, for example, about 23° C. The time of immersion may be any suitable time period for obtaining a desired level of porosity and/or pore size range in the porous substrate, and may range from a few seconds to a few minutes, such as a time from 5 seconds to 30 minutes, for example.

The thickness of the porous substrate formed may depend on the thickness of the thin film coated. The porous substrate formed may have a thickness ranging from about 50 µm to about 200 µm, such as about 50 µm to about 100 µm, or about 60 µm to about 80 µm. In some embodiments, the porous substrate has a thickness of about 70 µm. The overall porosity of the porous substrate may be in the range of about 30% to about 80%, such as about 60% to about 80%, about 50% to about 80%, or about 30% to about 50%.

The porous substrate may have one or more layers having different porosity. The change in porosity between the layers may be gradual, i.e. no distinct layers are formed. In some embodiments, two or more distinct layers are formed. The porous substrate may comprise a layer having elongated shaped or needle-like pores. The mean pore diameter of the pores in the first layer may range from about 1 µm to about 10 µm, such as about 1 µm to about 5 µm or about 3 µm to about 8 µm. In one embodiment, the mean pore diameter of the pores in the first layer ranges from about 1 µm to about 7 µm. In another embodiment, the mean pore diameter of the pores in the first layer ranges from about 3 µm to about 7 µm. The porous substrate may comprise a second layer having a sponge-like structure. This sponge-like structure may be caused by delayed liquid-liquid demixing of the polymer solution via phase inversion. The thickness and pore size of the sponge-like layer may generally be controlled by varying, for example, composition of the polymer solution, concentration of polymer in the solution, and composition of the coagulant bath. The mean pore diameter of the pores in the second layer may range from about 10 nm to about 100 nm, such as about 50 nm to about 100 nm or 30 nm to about 70 nm. Typically, the thickness of the second layer is less than 5 µm, such as about 1 µm, 2 µm, 3 µm or 4 µm. The second layer may be formed at one side of the porous substrate. Accordingly, the porous substrate may comprise a first layer having elongated shaped or needle-like pores and a second layer having a sponge-like structure adjacent to the first layer.

The contact angle of the porous substrate may range from about 40° to about 100°. In some embodiments, the contact angle of the porous substrate ranges from about 50° to about 80°. The pure water flux of the porous substrate may be in the range of 30 L/m²·h to 1000 L/m²·h at a trans-membrane pressure of 100 kPa, such as about 100 L/m²·h to about 500 L/m²·h, about 500 L/m²·h to about 1000 L/m²·h, or 300 L/m²·h to about 800 L/m²·h.

In various embodiments of the present invention, the thin film may be formed on a woven mesh placed on a suitable substrate. The woven mesh may serve as a reinforcing layer to impart greater mechanical strength to the resulting membrane. The woven mesh may be made of any suitable material, such as a polymeric material. For example, the woven mesh may be of the same material used to form the porous substrate. In some embodiments, the woven mesh is made from polyester (PET), polypropylene (PP) or nylon.

The woven mesh has a sufficient level of porosity so as not to unduly affect the effective driving force or osmotic pressure difference across the membrane, which may otherwise result in internal concentration polarization. Typically, the woven mesh has a porosity of about 20% to about 80%, such as about 30% to about 70% or about 50% to about 80%. Likewise, the woven mesh may be sufficiently thin so as not to unduly affect the effective driving force across the resulting membrane. For example, the woven mesh may have a thickness of about 30 µm to about 120 µm. In some embodiments, the woven mesh has a thickness of about 40 µm to about 70 µm. The degree of porosity and thickness of the woven mesh used may be varied by the skilled person to reduce the propensity of internal concentration polarization while maintaining sufficient mechanical strength.

The porous substrate formed comprising a woven mesh may have a thickness ranging from about 60 µm to about 200 µm, such as about 80 µm to about 170 µm, or about 150 µm to about 200 µm. The polymer solution may partially penetrate into the openings of the woven mesh to allow the polymer layer and the mesh to be bonded together. Accordingly, the thickness of the porous substrate comprising the woven mesh may be smaller than the combined thickness of the porous substrate and the woven mesh. Generally, the thickness of the porous substrate comprising a woven mesh is less than 200 µm, which lowers the propensity for internal concentration polarization. In some embodiments, the porous substrate has a thickness of about 170 µm. The overall porosity of the porous substrate may be in the range of about 30% to about 70%, such as about 40% to about 60%, about 50% to about 70%, or about 30% to about 50%.

The contact angle of the porous substrate comprising a woven mesh may range from about 40° to about 100°. In some embodiments, the contact angle of the porous substrate ranges from about 50° to about 80°. The pure water flux of the porous substrate may be in the range of 30 L/m²·h to 1000 L/m²·h at a trans-membrane pressure of 100 kPa, such as about 100 L/m²·h to about 500 L/m²·h, about 500 L/m²·h to about 1000 L/m²·h, or 300 L/m²·h to about 800 L/m²·h.

The method of the invention comprises forming a rejection layer on the porous substrate. As used herein, the term "rejection layer" refers to a layer that selectively controls the extent of and/or the passage of components from one side of the membrane to the other side. Ideally, the rejection layer formed should have high water permeability and high salt rejection. In various embodiments, the rejection layer may be formed on the second layer having a sponge-like structure of the porous substrate. The flatter surface morphology of the sponge-like layer relative to the first layer with elongated shaped or needle-like pores may allow formation of a more uniform and/or integral layer of the rejection layer. The first layer having the elongated shaped or needle-like pores, on the other hand, may allow a higher water flux through the porous substrate by virtue of its lower resistance to mass transfer across the layer.

Prior to forming the rejection layer, the porous substrate may first be heated by placing in deionized water at a temperature of about 60° C. to about 90° C., such as about 70° C. to about 80° C., for a sufficient time period. Generally, the heating time ranges from about 1 minute to about 5 minutes, and may range from about 1 minute to about 2 minutes. Subsequently, the porous substrate may be cooled by placing it in deionized water, which may be at room temperature. The heating and cooling procedure may be used to achieve a stable pore structure in the porous substrate.

In one embodiment, the rejection layer comprises a polyamide. The rejection layer may be formed by contacting the porous substrate with an aqueous amine solution and an organic acyl halide solution. Although the contacting need not follow a specific order, generally, the porous substrate is first contacted with the aqueous amine solution followed by contact with the organic acyl halide solution. The method of contacting may take place via immersion. For example, the porous substrate may first be immersed in the aqueous amine solution and subsequently immersed in the organic acyl halide solution. In some embodiments, the porous substrate is immersed in the aqueous amine solution for about 2 minutes to about 10 minutes, such as about 2 minutes to about 5 minutes. Subsequently, the porous substrate that is soaked with aqueous amine may be immersed in the organic acyl halide solution for about 0.5 minutes to about 10 minutes, such as about 1 minute to about 2 minutes, to form an ultrathin polyamide film acting as the rejection layer over the surface of the substrate.

The aqueous amine solution may be formed from aromatic diamines, such as m-phenylenediamine (MPD), p-phenylenediamine or substituted derivatives thereof, wherein the substituent is an alkyl group, an alkoxy group, a hydroxy alkyl group, a hydroxy group or a halogen atom; aromatic secondary diamines, such as N,N'-diphenylethylene diamine, cycloaliphatic primary diamines, such as cyclohexane diamine; cycloaliphatic secondary diamines, such as piperazine or trimethylene dipiperidine; and xylene diamines such as m-xylene diamine. In various embodiments, the aqueous amine solution contains m-phenylenediamine (MPD). The m-phenylenediamine may have a concentration of about 0.5 to about 4 wt % in the aqueous amine solution. In some embodiments, the concentration of m-phenylenediamine in the aqueous amine solution is about 1 wt % to about 2 wt %.

The porous substrate may subsequently be contacted with the organic acyl halide solution to form the rejection layer. Examples of halides include iodides, bromides and chlorides. Because of their lower cost and greater availability, chlorides are generally preferred over other halides such as bromides or iodides. In various embodiments of the invention, the organic acyl halide solution is an organic acyl chloride solution. The organic acyl chloride solution may comprise an acyl chloride dissolved in a solvent. Examples of suitable acyl chloride that may be used include, but are not limited to, trimesoyl chloride (TMC), 5-isocyanato-isophthaloyl chloride (ICIC), 5-chloroformyloxy-isophthaloyl chloride (CFIC), cyclohexane-1,3,5-tricarbonyl chloride, isophthaloylchloride, tetraphthaloyl chloride, combinations thereof and derivatives thereof. Suitable solvents that may be used are those which are able to dissolve but which do not react with the acyl chloride. For example, the solvent may be aliphatic hydrocarbons such as hexane, cyclohexane, pentane, and heptane, aromatic hydrocarbons such as benzene and toluene, and halogenated hydrocarbons such as methylene chloride, 1,1,1-trichloroethane, trichloroethylene and perchloroethylene. In one embodiment, trimesoyl chloride is dissolved in hexane to form the organic acyl chloride solution. The concentration of acyl chloride monomer in the organic acyl chloride solution may be in the range from about 0.05 wt/v % to about 2 wt/v %, such as about 0.1 wt/v % to about 0.5 wt/v %, or about 0.05 wt/v % to about 0.1 wt/v %.

In a second aspect, the present invention refers to a forward osmosis membrane. The forward osmosis membrane comprises a woven mesh, a porous substrate bonded to the woven mesh, and a rejection layer formed on the porous substrate. Accordingly, the forward osmosis membrane may also be termed as a thin film composite forward membrane. The woven mesh may have a porosity of about 20% to about 80%, such as about 30% to about 70%.

In a third aspect, the present invention refers to a forward osmosis membrane formed by a method according to the first aspect.

In a fourth aspect, the present invention refers to use of the forward osmosis membrane according to the second aspect or the third aspect in a forward osmosis process.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1

Chemicals and Membrane Materials

Unless otherwise specified, all chemicals were of analytical grade with purity over 99% and were used as received. Ultrapure water was supplied from a Milli-Q ultrapure water system (Millipore Singapore Pte Ltd) with a resistivity of 18.2 M Ohm·cm.

Polysulfone beads (PSf, molecular weight about 75,000 to 81,000 Da, Solvay Advanced Polymers, LLC, GA) were used for preparing the membrane substrates. N-methyl-2-pyrrolidone (NMP, Merck Schuchardt OHG, Hohenbrunn) was used as the solvent for the casting solution. Polyvinyl pyrrolidone (PVP, average molecular weight about 1,300,000 Da, Alfa Aesar, MA) and lithium chloride (LiCl, Sinopharm Chemical Reagent Co. Ltd, China) were used as additives in the casting solution.

Chemicals used for interfacial polymerization included m-phenylenediamine (MPD, Sigma-Aldrich Pte. Ltd, Singapore), trimesoyl chloride (TMC, Sinopharm Chemical Reagent Co. Ltd, China), and n-hexane (Fisher Scientific, NJ).

The woven PET mesh was supplied by Anping Shengyuan Metal Wire Mesh Factory in China.

Three commercial forward osmosis membranes obtained from HTI (Albany, OR) and one commercial reverse osmosis membrane obtained from Dow FilmTec (Minneapolis, MN) were used for comparison purposes. The HTI forward osmosis membranes were based on cellulose triacetate (CTA). One of the forward osmosis membranes was cut from a Hydrowell® module (denoted as CTA-HW). It was formed by casting cellulose triacetate onto a polyester woven fabric. The other two membranes were received as flat coupons, either supported by a polyester woven fabric (denoted as CTA-W) or a non-woven fabric (denoted as CTA-NW). The reverse osmosis membrane BW30 was a thin film composite (TFC) polyamide membrane supported by a non-woven fabric. In some experiments, the non-woven fabric of BW30 was carefully removed before characterizing and evaluating the membrane (denoted as BW30-o in this study).

Example 2

Synthesis of Flat-Sheet Thin Film Composite Forward Osmosis Membranes

The thin film composite forward osmosis membranes were prepared via two steps: 1) a phase inversion step to form the membrane substrate (Example 2.1), and 2) an interfacial polymerization step to form the active rejection layer (Example 2.2).

2.1 Preparation of Forward Osmosis Substrate

To prepare a casting solution for forward osmosis substrate, measured amounts of polysulfone, polyvinyl pyrrolidone and lithium chloride (refer to Table 1 in FIG. 1) were dissolved in N-methyl-2-pyrrolidone and stirred by magnetic stirrers at 70° C. until the solution became homogeneous and transparent. After cooling down to room temperature (about 23° C.), the polymer solution was filtered with a stainless steel filter connected to compressed nitrogen gas cylinder. The filtered dope was then degassed in air-tight bottles for 24 hours before use. To prepare the polysulfone support, the casting solution was spread onto a clean glass plate to form a uniform film using an Elcometer 4340 Motorised Film Applicator (Elcometer Asia Pte Ltd). The film was then quickly and smoothly immersed with the glass plate into a coagulant bath where tap water at about 23° C. was used as coagulant. The nascent substrate was kept in flowing water bath to remove residual solvent and stored in ultrapure water before use.

2.2 Preparation of Polyamide Rejection Layer

The active rejection layer of thin film composite forward osmosis membrane was prepared by interfacial polymerization on the surface of a pre-casted polysulfone substrate. The preparation was carried out at room temperature (about 23° C.) unless otherwise specified. The substrate was heated in 70° C. ultrapure water for 2 minutes before cooling down to room temperature. It was then soaked in an aqueous solution of m-phenylenediamine for 2 minutes, and the excessive m-phenylenediamine solution on the substrate surface was removed with compressed air. Subsequently, an n-hexane solution of trimesoyl chloride was gently poured onto the m-phenylenediamine-soaked substrate and was allowed to react with the residual m-phenylenediamine for 1 minute to form the polyamide rejection layer. The resultant thin film composite composite membrane was rinsed with tap water to remove the residual monomers and was stored in ultrapure water before characterization. Two types of thin film composite forward osmosis membranes were synthesized (denoted as TFC-1 and TFC-2), and their preparation conditions are summarized in Table 1 in FIG. 1.

Example 3

Membrane Characterization
3.1 Characterization of Membrane Morphology, Porosity, and Contact Angle The morphologies of the membranes were observed with a scanning electron microscope (SEM) according to the method described in Tang et al. (C. Y. Tang, Q. She, W. C. L. Lay, R. Wang, A. G. Fane, *Journal of Membrane Science*, 354 (2010) 123-133).

Membrane samples were dried in vacuum at room temperature for 24 hours. Samples were then fractured in liquid nitrogen and coated with a thin layer of gold using an EMITECH SC7620 sputter coater (Quorum Technologies Ltd, UK). SEM images of membrane surface and cross-section were obtained using a Zeiss EVO 50 Scanning Electron Microscope (Carl Zeiss Pte. Ltd.).

Membrane porosity ($\varepsilon$) was determined by measuring the dry mass ($m_{dry}$) and wet mass ($m_{wet}$) of membrane samples according to Equation (1)

$$\varepsilon = \frac{(m_{wet} - m_{dry})/\rho_w}{(m_{wet} - m_{dry})/\rho_w + m_{dry}/\rho_p} \times 100\% \quad (1)$$

where $\rho_w$ and $\rho_m$ are density of wetting solvent (water was used in the current study) and polymer respectively.

Contact angles of the membranes were measured with the sessile drop method, using a geniometer (Contact Angle System OCA, DataPhysics Instruments GmbH). Membrane samples were dried in vacuum at room temperature for 24 hours. Small water droplets were applied onto a levelled membrane surface and profiles of the water drops were captured by an optical system to determine the contact angles.

3.2 Measurement of Membrane Intrinsic Separation Properties

Intrinsic separation properties of forward osmosis membranes were evaluated in a cross-flow filtration setup in the reverse osmosis testing mode (i.e., pressurized mode) according to Tang et al. (C. Y. Tang, Q. She, W. C. L. Lay, R. Wang, A. G. Fane, *Journal of Membrane Science*, 354 (2010) 123-133). The water permeability A of a membrane was evaluated by reverse osmosis tests over an applied pressure range of 1-5 bar with ultrapure water as feed. The A value was calculated according to Equation (2)

$$A = J/\Delta p \quad (2)$$

where $\Delta p$ is the applied trans-membrane pressure and J is the permeate water flux. The permeability of the polysulfone substrate was determined similarly.

Sodium chloride rejection and salt permeability B of a membrane were measured in the reverse osmosis setup over 1-5 bar, using 20 mM sodium chloride solution as feed. External concentration polarization was minimized by using diamond patterned feed spacer and relatively high cross flow (1.2 L/min). Further increasing the cross flow to 3.6 L/min had negligible effect on rejection, which suggests that external concentration polarization was not important in the current study. Rejection R was determined based on conductivity measurement (Ultra Meter II™ 4P, Myron L Company, CA) of the feed and the permeate according to Equation (3)

$$R = \frac{c_f - c_p}{c_f} \times 100\% \quad (3)$$

where $c_f$ and $c_p$ are the salt concentrations in the feed and the permeate, respectively.

The salt permeability B of a membrane was calculated according to Equation (4)

$$B = \left(\frac{1}{R} - 1\right) \times J \quad (4)$$

3.3 Forward Osmosis Performance Evaluation

The forward osmosis performance (water flux and salt flux) was evaluated with a bench-scale forward osmosis setup as described in Tang et al. (C. Y. Tang, Q. She, W. C. L. Lay, R. Wang, A. G. Fane, *Journal of Membrane Science*, 354 (2010) 123-133). Both feed solution and draw solution were circulated at a fixed cross flow rate of 500 ml/min. Concentrated sodium chloride solutions (0.5 M and 2.0 M) were used as draw solutions. The feed solution contained 10 mM sodium chloride. Both AL-DS and AL-FS membrane orientations were tested. The forward osmosis water flux $J_v$ was determined by measuring the weight change of feed solution using Equation (5)

$$J_v = \frac{\Delta V_{feed}}{A_m \times \Delta t} = \frac{\Delta m_{feed} / \rho_{feed}}{A_m \times \Delta t} \quad (5)$$

where $\Delta V_{feed}$ and $\Delta m_{feed}$ are the volume and weight changes of feed solution, respectively; $\rho_{feed}$ is the density of feed solution; $\Delta t$ is the measuring time interval.

The forward osmosis solute flux $J_s$ was determined by calculating the change of salt content in feed solution based on conductivity measurements using Equation (6)

$$J_s = \frac{V_t \cdot c_t - V_0 \cdot c_0}{A_m \cdot \Delta t} \quad (6)$$

where $V_0$ and $V_t$ are the initial and final volumes of feed solution, respectively; $c_0$ and $c_t$ are the initial and final salt concentrations of feed solution, respectively.

3.4 Determining Membrane Structural Parameter

The structural parameter s is one of the critical properties of forward osmosis membranes. It is defined as the product of support layer thickness (l) and tortuosity ($\tau$) over its porosity ($\varepsilon$) according to Equation (7)

$$s = \frac{l \cdot \tau}{\varepsilon} \quad (7)$$

A large s value inevitably leads to severe internal concentration polarization. According to the classical internal concentration polarization model developed by Loeb et al. (S. Loeb, L. Titelman, E. Korngold, J. Freiman, *Journal of Membrane Science*, 129 (1997) 243-249), the forward osmosis water flux can be predicted by Equations (8) and (9):

$$\text{Concentrative } ICP \text{ (AL-DS): } J_v = \frac{D}{s}\left[\ln\frac{A\pi_{draw} - J_v + B}{A\pi_{feed} + B}\right] \quad (8)$$

$$\text{Dilutive } ICP \text{ (AL-FS): } J_v = \frac{D}{s}\left[\ln\frac{A\pi_{draw} + B}{A\pi_{feed} + J_v + B}\right] \quad (9)$$

where D is the solute diffusion coefficient; $\pi_{draw}$ and $\pi_{feed}$ are the osmotic pressures of the draw solution and feed solution, respectively. Thus, the structural parameter s can be determined experimentally from Equations (8) and (9).

Example 4

Characterization of Membrane Substrates

Two thin film composite forward osmosis membranes, TFC-1 and TFC-2, were fabricated in the current study (Table 1 in FIG. 1), and their substrates are denoted as S-1 and S-2, respectively. The structures of these two substrates are shown in FIGS. 2(a) to (d) for S-1 and FIGS. 3(a) to (d) for S-2.

Figures 1, 2:
FIG. 1 is a table ('Table 1') summarizing the synthesis conditions for thin film composite forward osmosis membranes according to various embodiments of the invention. Two thin film composite forward osmosis membranes, TFC-1 and TFC-2, were fabricated in the current study, and their substrates are denoted as S-1 and S-2, respectively. Notation a in the table represents the following:
 a: Compositions of monomer solutions (MPD dissolved in water and TMC dissolved in n-hexane) are listed.
FIG. 2 are scanning electron microscope (SEM) micrographs of substrate S-1. (a) and (b) cross-section, (c) bottom surface, and (d) top surface. Scale bar in (a) denotes 10 μm. Scale bar in (b) to (d) denotes 1 μm.
Figure 2:
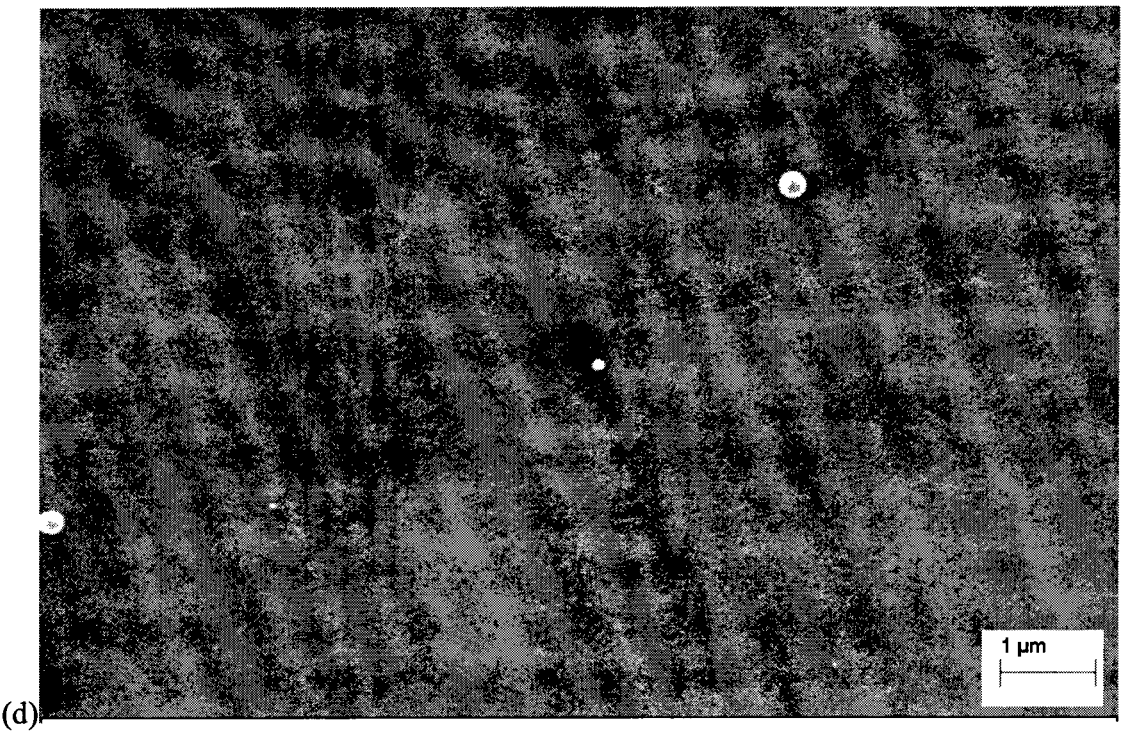
Figure 3:
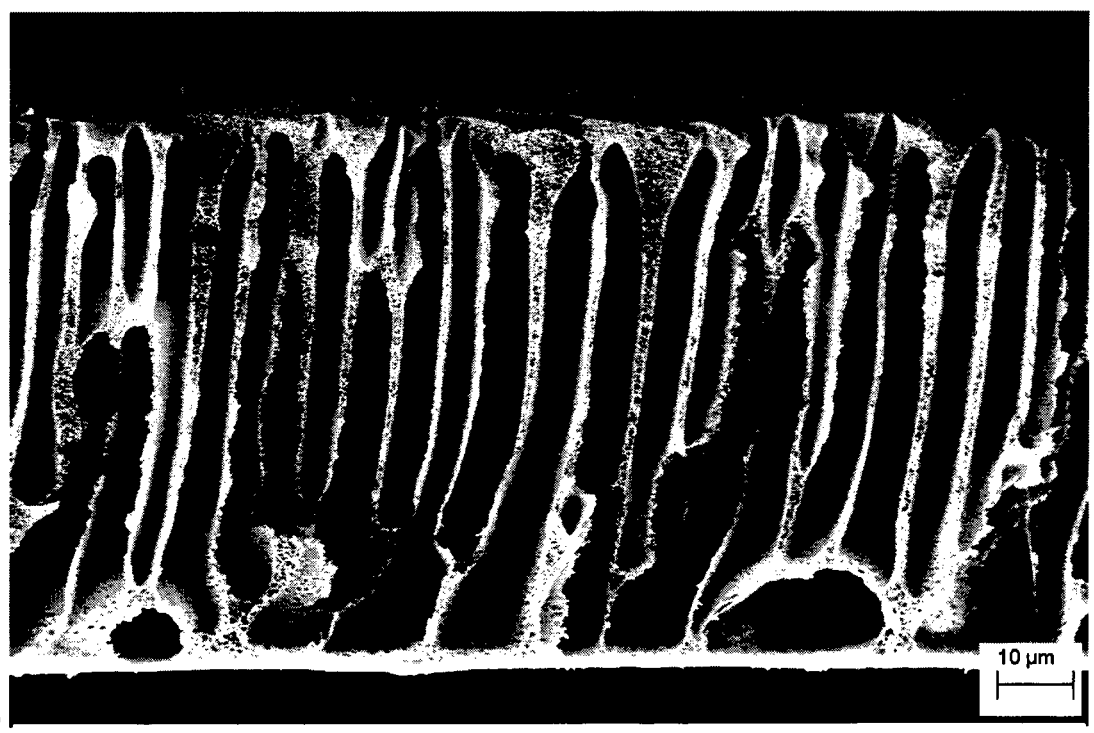
FIG. 3 are scanning electron microscope (SEM) micrographs of substrate S-2. (a) and (b) cross-section, (c) bottom surface, and (d) top surface. Scale bar in (a) denotes 10 μm. Scale bar in (b) to (d) denotes 1 μm.

FIG. 2 are scanning electron microscope (SEM) micrographs of substrate S-1. (a) and (b) cross-section, (c) bottom surface, and (d) top surface. Scale bar in (a) denotes 10 μm. Scale bar in (b) to (d) denotes 1 μm. FIG. 3 are scanning electron microscope (SEM) micrographs of substrate S-2. (a) and (b) cross-section, (c) bottom surface, and (d) top surface. Scale bar in (a) denotes 10 μm. Scale bar in (b) to (d) denotes 1 μm.

Figures 3, 4:
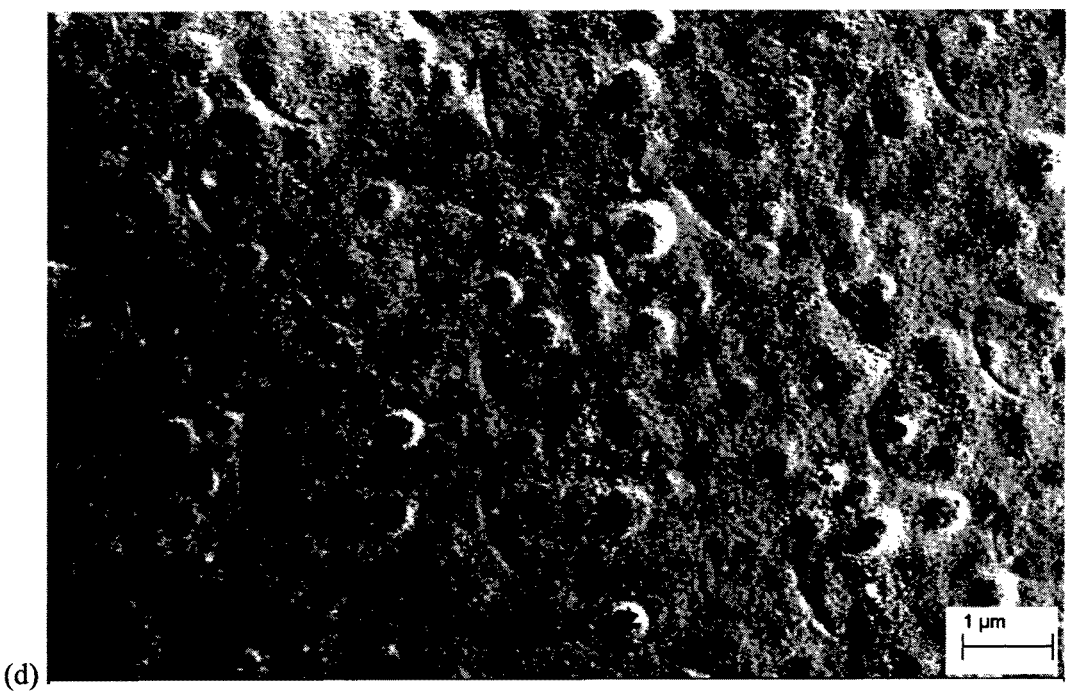
FIG. 4 is a table ('Table 2') summarizing the characteristics of forward osmosis membrane substrates. Three commercial forward osmosis membranes obtained from HTI (Albany, OR) and one commercial reverse osmosis membrane obtained from Dow FilmTec (Minneapolis, MN) were used for comparison purposes. The HTI forward osmosis membranes were based on cellulose triacetate (CTA). One of the forward osmosis membranes was cut from a Hydrowell® module (denoted as CTA-HW). It was formed by casting cellulose triacetate onto a polyester woven fabric. The other two membranes were received as flat coupons, either supported by a polyester woven fabric (denoted as CTA-W) or a non-woven fabric (denoted as CTA-NW). The reverse osmosis membrane (denoted as BW30) was a thin film composite (TFC) polyamide membrane supported by a non-woven fabric. In some experiments, the non-woven fabric of BW30 was carefully removed before characterizing and evaluating the membrane (denoted as BW30-o in this study).

From the SEM micrographs, both substrates had overall thickness of about 75 μm (see FIGS. 2(a) and 3(a), and Table 2 in FIG. 4). These substrates had highly porous structures with long finger-like pores formed under a thin sponge-like skin layer (thickness <2 μm, see FIGS. 2(b) and 3(b)). The finger-like pores are preferred for forward osmosis membranes to minimize the structural parameter, since such pores have a tortuosity of nearly unity (see Equation (7)). Gravimetric measurements confirmed that both substrates had high porosities (77±3% for S-1 and 82±2% for S-2, see Table 2 in FIG. 4). Corresponding to the high porosity and the finger-like pore structures, relatively small s values were achieved for both substrates (0.71±0.14 mm for S-1 and 0.67±0.17 mm for S-2, see Table 2 in FIG. 4).

The slightly higher porosity for S-2 is consistent with the lower polysulfone concentration used to cast this substrate. In addition, while some macrovoids were developed at the bottom of S-1 (see FIG. 2(b)), substrate S-2 had more uniform and better defined pores with pore diameters on the order of a few micrometers (see FIG. 3(b)). The improved pore structure of S-2 was likely due to the use of lithium chloride additive as a pore former. Other recipes with the addition of lithium chloride showed similar improvements.

Cross-sectional SEM image of another sample prepared with casting solution of PSf/NMP/PEG/LiCl (16%/77%/5%/2% by weight) is presented in FIG. 17 as an example.

The bottom surfaces of S-1 and S-2 are shown in FIGS. 2(c) and 3(c), respectively. Sub-micrometer pores were observed for both substrates, although the pores for S-2 were larger. Similarly, the top surface (i.e., the spongy skin layer) of S-2 also appeared more porous than S-1 (FIGS. 2(d) and 3(d)). As a result of its higher bulk and surface porosity as well as the improved pore structure, S-2 had a relatively high pure water permeability of 190 L/m²·h·bar, nearly double of that for S-1.

Based on Equation (7) and assuming a tortuousity of 1.0, the contribution of the finger like pores to the overall structural parameter can be estimated (0.1 mm for S-1 and 0.09 mm for S-2). The large difference between the measured overall s values and the estimated values for the finger-like pores can be attributed to 1) the termination of some finger-like pores before they reached the back surface of the substrates (i.e. dead-end pores), and 2) the presence of the sponge-like skin layer (see FIGS. 2(b) and 3(b)).

The porosity of this skin layer was likely much lower compared to the bulk porosity of the substrates. While the skin layer thickness was less than 2 μm, it nevertheless can have significant contribution to the overall structural parameter as a result of its tortuous nature and low porosity. From membrane fabrication point of view, there is a need to optimize this spongy skin layer. An overly porous skin layer with large surface pores may result in more defects in the polyamide rejection layer during interfacial polymerization and thus compromise the membrane rejection. On the other hand, an overall thick spongy skin layer with low porosity and high tortuosity may unnecessarily comprise the structural parameter.

In order to better understand the role of support structure on the structural parameter s (the current section) and that on the forward osmosis performance (see Example 6), four commercial membranes (CTA-HW, CTA-W, CTA-NR, and BW30) were also characterized. In addition, samples of BW30 with its non-woven fabric support removed (denoted as BW30-o) were also studied. The properties of these membranes are summarized in Table 2 in FIG. 4, with their SEM cross-sectional micrographs shown in FIGS. 5(a) to (e).

FIG. 5 shows scanning electron microscope (SEM) cross-sectional micrographs of commercial forward osmosis and reverse osmosis membranes, with (a) CTA-HW forward osmosis membrane, (b) CTA-W forward osmosis membrane, (c) CTA-NW forward osmosis membrane, (d) BW30 reverse osmosis membrane, and (e) BW30 membrane without reinforcing fabric (BW30-o). Slightly different magnifications have been used for different membranes in order to show both the overall membrane structure as well as the fine features of membrane pores. This does not affect the interpretation of the results. Scale bar in (a) to (d) denotes 20 μm. Scale bar in (e) denotes 10 μm.

As shown in the micrographs, the CTA-HW (see FIG. 5(a)) and CTA-W (see FIG. 5(b)) membranes had a unique structure, in that both membranes have woven polyester meshes embedded in the asymmetric cellulose triacetate membranes. These meshes had a fiber size of about 30 μm to about 40 μm, and a fiber-to-fiber distance of about 130 μm to about 170 μm. These results are in good agreement with previous microscopic observations. Due to the presence of such woven meshes, the thickness of the membranes was highly non-uniform, and regions away from the mesh fibers were thinner than regions where fibers were located.

Based on our current microscopic observations of multiple locations, the CTA-HW membrane had a thickness ranging from about 60 μm at the thinnest location to about 90 μm at the thickest location. The support layer of this membrane was highly porous ($\varepsilon$=64%, see Table 2 in FIG. 4), which was also confirmed by the SEM cross-section (see FIG. 5(a)) showing numerous large finger-like pores (about 10 μm to 40 μm in diameter). The measured s value was about 0.72 mm, comparable to the substrates developed in the current study (Table 2 in FIG. 4). Compared to CTA-HW, the membrane CTA-W had a much less porous structure, as large-sized pores were only observed near the fabric fibers (see FIG. 5(b)). As a result, its porosity was only about 46%. Correspondingly, the structural parameter for CTA-W was higher than that for CTA-HW, despite the thinner section for CTA-W (only about 20 μm at the thinnest location, see FIG. 5(b) and Table 2 in FIG. 4). This confirms the importance of substrate porosity in determining the structural parameter, whereby large porosity is preferred to achieve a lower s value, agreeing well with Equation (7).

The structure of CTA-NW is shown in FIG. 5(c). Unlike the woven-supported CTA-HW and CTA-W, the membrane CTA-NW had asymmetric cellulose triacetate layer supported by a non-woven fabric. The cellulose triacetate layer was about 60 μm in thickness, and the non-woven fabric layer had a thickness about 80 μm. Consequently, the overall thickness of CTA-NW was much greater than the other two cellulose triacetate forward osmosis membranes (see Table 2 in FIG. 4). The cellulose triacetate layer of CTA-NW had a comparable thickness to that of CTA-HW (see FIGS. 5(a) and 5(c)). In addition, these two membranes also had similar pore structures, although CTA-NW was slightly less porous (see Table 2 in FIG. 4). The s value for CTA-NW was about 1.38 mm, which was larger than that the s value for CTA-HW at about 0.72 mm. The larger s value for CTA-NW is consistent with its lower porosity and larger overall thickness due to the presence of the non-woven fabric layer.

Membrane BW30 is a typical commercial thin film composite polyamide membrane. This membrane comprises an ultrathin polyamide rejection layer, a polysulfone substrate, together with a non-woven fabric layer (see FIG. 5(d)). The thickness of the polysulfone layer and non-woven fabric layer were about 60 μm and about 90 μm respectively. As summarized in Table 2 in FIG. 4, BW30 had the largest overall thickness among all the membranes evaluated in the current study. In addition, its non-woven fabric layer also appeared more compact and less porous than that of CTA-NW (see FIGS. 5(c) and 5(d)), presumably due to the need to withstand significantly higher applied pressure for typical reverse osmosis applications. Thus, it is not surprising to see that the s value for BW30 (37.5±19.6 mm) was the largest among the various membranes as shown in Table 2 in FIG. 4, due in part to the thick and compact non-woven fabric layer.

However, the large s value cannot be solely attributed to the fabric layer. As can be seen from Table 2 in FIG. 4, upon removing the non-woven fabric layer, the resulting membrane (BW30-o, see FIG. 5(e)) still had a very large s value of about 14.0 mm. Compared to the other membranes, BW30 and BW30-o had a spongy pore structure for the polysulfone substrate instead of the straight finger-like pore structure. Despite its significant porosity of about 50% (see Table 2 in FIG. 4), this spongy structure will likely results in a high tortuosity value. This may help to explain why the s value of BW30-o was an order of magnitude higher than the other membranes, even though its thickness and porosity were comparable to other membranes. This result is also consistent with the previous discussion that the s values of membranes TFC-1 and TFC-2 were mainly contributed by the sponge-like skin layer despite its small thickness (<2 μm).

The hydrophobicity of the polysulfone substrates prepared in the current studies was also characterized using contact angle measurements and summarized in Table 2 in FIG. 4. Both S-1 and S-2 had contact angles of about 55°, which are lower than that of the polysulfone layer of BW30 (about 92°) as well as those of the cellulose triacetate membranes. The relatively low contact angles for S-1 and S-2 can be attributed to the addition of polyvinyl pyrrolidone in the membrane casting solutions. Additional substrates prepared without the addition of polyvinyl pyrrolidone had much higher contact angle values. For example, substrates prepared with casting solution of PSf/NMP/PEG/LiCl (16%/77%/5%/2% by weight) showed contact angle as high as 78°. It is believed that hydrophilic substrates tend to have better forward osmosis flux performance as a result of improved wetting.

Example 5

Characterization of Membrane Resection Layers

The active rejection layers of the thin film composite forward osmosis membranes were synthesized on top of the polysulfone substrates via interfacial polymerization, where the sponge-like skin layers of the substrates were responsible for providing a smooth surface and sufficient mechanical cushion for the polyamide rejection layers.

FIG. 6 are scanning electron microscope (SEM) micrographs of polyamide rejection layers. (a) TFC-1 and (b) TFC-2. Scale bar in (a) and (b) denotes 1 μm. As shown in the SEM images, the polyamide layers formed had a ridge-valley structure that is typical for thin film composite polyamide membranes formed by trimesoyl chloride and m-phenylenediamine monomers.

FIG. 7 is a table ('Table 3') summarizing the properties of synthesized thin film composite forward osmosis membranes and commercial membranes. The contact angles of the polyamide rejection layers synthesized in the current study were about 43° to about 45°, comparable to that measured for BW30, but lower than those of the cellulose triacetate forward osmosis membranes (see Table 3 in FIG. 7). The separation properties (water permeability A, sodium chloride rejection R, and sodium chloride permeability B) of membranes TFC-1 and TFC-2 were characterized and compared to commercial forward osmosis and reverse osmosis membranes (see Table 3 in FIG. 7).

Both TFC-1 and TFC-2 exhibited comparable or even higher water permeability and better sodium chloride rejection compared to the commercial cellulose triacetate forward osmosis membranes (Table 3 in FIG. 7). For example, TFC-2 had a pure water permeability of about $5.0 \times 10^{-12}$ m/s·Pa, which is approximately 50% higher than that of the CTA-HW membrane. At applied pressure of 3.75 bar in the reverse osmosis testing mode, TFC-1 and TFC-2 had decent sodium chloride rejection of 94.5% and 93.4%, respectively. It is noted that the solute rejection of an forward osmosis can increase significantly at higher testing pressures. TFC-2 had improved water permeability over TFC-1, partially due to the use of the surfactant SDS in its recipe to improve the interfacial polymerization process (see Table 1 in FIG. 1). The commercial BW30 membrane (with or without fabric) also had high water permeability (about $8 \times 10^{-12}$ m/s·Pa) while maintaining acceptable sodium chloride rejection of about 92% at 3.75 bar. At 13.8 bar, BW30 has a rejection of about 98%.

FIG. 8 is a graph depicting the sodium chloride salt permeability B against water permeability A, for both thin film composite polyamide membranes as well as the cellulose triacetate based membranes. In general, data points with higher water permeability and lower sodium chloride permeability (corresponding to the lower right corner of FIG. 8) are preferred. Compared to the cellulose triacetate membranes that had relatively low A values, the thin film composite polyamide membranes (TFC-1, TFC-2, and BW30) showed superior separation properties of the rejection layers. Historically in the reverse osmosis field, thin film composite membranes have replaced cellulose acetate based membranes due to their superior separation properties and excellent pH stability (stable over pH level of about 3 to about 10). An added advantage of thin film composite membranes is that the rejection layer and the substrate can be individually optimized via the two-step fabrication method (phase inversion followed by interfacial polymerization). Such flexibility is especially valuable for forward osmosis membrane synthesis, due to the critical importance of both the support layer structure and the rejection layer separation properties. With a tailored support structure to minimize the structural parameter and internal concentration polarization, thin film composite polyamide based membranes are promising alternatives to existing cellulose triacetate based forward osmosis membranes.

The B/A values of the various membranes are also tabulated in Table 3 in FIG. 7. The B/A ratio is a direct indicator of the selectivity of an forward osmosis membrane. A larger B/A ratio (i.e., lower selectivity) is likely to cause more severe solute reverse diffusion from the draw solution into the feed water, which can lead to undesirable solute accumulation in forward osmosis systems as well as accelerated forward osmosis membrane fouling. In addition, the rejection of contaminants (such as micropollutants) by a dense membrane is also affected by the B/A ratio, with lower B/A ratio (improved selectivity) generally preferred. In the current study, both TFC-1 and TFC-2 had relatively low B/A ratios, once again indicating their superior separation properties.

Example 6

Forward Osmosis Performance Evaluation

The forward osmosis water flux of the synthesized thin film composite forward osmosis membranes as well as the commercial membranes are presented in Table 4 in FIG. 9, where the feed water contained 10 mM sodium chloride and the draw solution contained either 0.5 M or 2.0 M sodium chloride. Forward osmosis water flux is reported in units of L/m² h.

A comparison of the forward osmosis performance of these membranes with those reported in literature is also tabulated in Table 5 in FIG. 11. Among all the membranes evaluated in the current study, the commercial reverse osmosis membrane BW30 had the poorest forward osmosis water flux despite of its superior water permeability (A=$8.4 \times 10^{12}$ m/s·Pa or 3.04 L/m²·h·bar). A water flux of merely 1.59 L/m²·h was obtained in the AL-DS forward osmosis testing mode using a 2.0 M sodium chloride draw solution (osmotic pressure about 100 bar). In contrast, an applied pressure of only 0.5 bar would be needed to achieve the same water flux in the reverse osmosis mode.

Compared to the pressure-driven reverse osmosis mode, the osmotically-driven forward osmosis mode suffers from severe internal concentration polarization. For BW30 under the above mentioned testing conditions, about 99.5% of the overall osmotic driven force was lost due to internal concentration polarization. Such forward osmosis flux inefficiency for BW30 may be attributed to its sponge-like polysulfone substrate, as well as the thick and compact non-woven support which hinders mass transfer within its support. The lower forward osmosis water flux of the conventional thin film composite membranes with sponge-like supports may also be attributable to hydrophobicity of the support layer. Upon peeling away the non-woven fabric, the resulting membrane BW30-o still had unacceptably low water flux (see Table 4 in FIG. 9). The results obtained shows that sponge-like substrate, which tends to have large tortuosity value and thus promote severe internal concentration polarization, is highly undesirable for forward osmosis applications.

Both the commercial cellulose triacetate forward osmosis membranes and the thin film composite membranes fabricated in the current study had relatively low s values. Compared to BW30, these membranes achieved much higher forward osmosis water fluxes (see Table 4 in FIG. 9). Among the three commercial forward osmosis membranes obtained from HTI, the membrane CTA-HW had the highest forward osmosis water flux. This can be explained by 1) its higher water permeability (A=3.3×10$^{-12}$ m/s·Pa, see Table 3 in FIG. 7) compared to the other two membranes, as well as 2) its higher porosity (Table 2 in FIG. 4). The thin film composite forward osmosis membranes fabricated in the current study (TFC-1 and TFC-2) had the highest forward osmosis water fluxes among all the membranes evaluated. With a 2 M sodium chloride draw solution and using the AL-DS orientation, TFC-2 had a flux of about 54 L/m$^2$·h, which was 50% higher compared to that of CTA-HW, the best performing commercial forward osmosis membrane. TFC-1 and TFC-2 had an s value in the range of about 0.67 mm to 0.71 mm, similar to that of CTA-HW.

Thus, their better forward osmosis water flux over CTA-HW was mainly due to their superior separation properties (see Table 3 in FIG. 7). As predicted by Equations (8) and (9), a higher A value can result in improved water flux under otherwise identical test conditions. Consistent with this explanation, the more permeable TFC-2 had higher forward osmosis flux compared to TFC-1 and CTA-HW. These results demonstrate that both a low s value and a high A value are needed to achieve excellent forward osmosis water flux. While the commercial CTA-HW membrane may work in terms of its substrate to achieve a low s value (Section 3.1), its rejection layer was far from optimal. On the other hand, the conventional reverse osmosis membrane BW30 had superior water permeability but unacceptably large s value.

FIG. 10 are graphs depicting forward osmosis water flux and solute flux for synthesized thin film composite forward osmosis membranes and commercial membranes. Testing conditions: 10 mM sodium chloride as feed solution, 0.5 M sodium chloride as draw solution, with both membrane orientations: (a) AL-DS and (b) AL-FS.

An ideal forward osmosis membrane possesses high water flux $J_v$ and low solute flux $J_s$. A large $J_s$, indicating a severe leakage of draw solutes into the feed solution (for example, solute reverse diffusion), is detrimental to forward osmosis operation. Increased solute reverse diffusion can promote severe internal concentration polarization as well as membrane fouling. The $J_s/J_v$ ratio, which signifies the effective solute concentration reverse-diffused through the forward osmosis membrane, is represented by the slope between a data point and the origin. Thus, data points located in the lower right corner of the figures indicate preferred forward osmosis performances (higher $J_v$, lower $J_s$, and lower $J_s/J_v$ ratio).

As shown in the graphs, the thin film composite forward osmosis membranes TFC-1 and TFC-2 synthesized presently showed superior $J_v$ and $J_s$ combinations. Both TFC-1 and TFC-2 achieved high water flux while maintaining relatively low $J_s/J_v$ ratios. As discussed herein, the high water flux of the membranes was contributed by their optimized substrate structure and superior water permeability of the rejection layer. On the other hand, the low $J_s/J_v$ ratios can be attributed to their excellent selectivity as represented by their low B/A ratios (see Table 3 in FIG. 7). The current study suggests that thin film composite membranes offer significant advantages over integral asymmetric membranes—1) the thin film composite approach allows flexibility for independent optimization of the substrate and the rejection layer, and 2) the polyamide rejection layer formed by interfacial polymerization also tends to have better water permeability and solute rejection.

In summary from the above discussion, thin film composite forward osmosis membranes according to various embodiments of the invention have been synthesized. The membrane substrates, prepared by phase inversion of polysulfone, had straight finger-like pores under a thin sponge-like skin layer. The polyamide rejection layers were then formed by interfacial polymerization of trimesoyl chloride and m-phenylenediamine. The resulting forward osmosis membranes (TFC-1 and TFC-2) had small structural parameters (s values of about 0.67 mm to about 0.71 mm) as a result of the thin cross-section, low tortuosity, and high porosity of the membrane substrates. In addition, these membranes had high water permeability and selectivity.

In comparison to commercial CTA-based asymmetric forward osmosis membranes as well as the brackish water reverse osmosis membrane BW30, both TFC-1 and TFC-2 exhibited superior forward osmosis performance. With a 2 M sodium chloride draw solution in the AL-DS orientation, TFC-2 achieved a flux of about 54 L/m$^2$·h, which was 50% higher than the commercial forward osmosis membrane CTA-HW. This may be attributed to the combination of its high permeability rejection layer and its high porosity substrate with finger-like pore structure. Meanwhile, the thin film composite forward osmosis membranes had relatively low $J_s/J_v$ ratios as a result of their excellent rejection layer selectivity.

Example 7

Synthesis of Flat-Sheet Forward Osmosis Membrane with Reinforcing Mesh

Experiments have also been carried out to incorporate a reinforcing non-woven mesh in the membrane. In line with the above discussion, polymer solution made from 15.5 wt % polysulfone in N-methyl-2-pyrrolidone with 3 wt % lithium chloride and 0.5 wt % polyvinyl pyrrolidone (molecular weight of 1,300,000) was prepared as casting solution.

Subsequently, substrates with and without mesh were cast. For the first embodiment, the dope was spread directly on a clean glass plate. The gap between casting knife and glass plate, hence the thickness of liquid film formed, was 150 μm. In the second embodiment, PET mesh with thickness of between about 62 μm to abut 71 μm, and opening of 33% was attached to the glass plate with adhesive tape and wetted with mixture of acetone and N-methyl-2-pyrrolidone (4:1 by volume). After excess solvent was removed from the surface, the dope was spread on and completely covered the mesh. The gap between casting knife and glass plate was 120 µm. Both liquid films were immediately immersed into coagulant bath together with the glass plate. Room temperature tap water was used as coagulant.

Two monomer solutions were prepared for interfacial polymerization on the prepared substrates. Aqueous amine solution was prepared with 1.5 wt % m-phenylenediamine in deionized water. Acid chloride solution was prepared with 0.1 wt/v % trimesoyl chloride in hexane. Reaction time of interfacial polymerization was 1 minute.

FIG. 12 shows the SEM micrographs of thin film composite flat-sheet forward osmosis membranes synthesized (a) with reinforcing mesh, (b) without mesh in the support layer. The images were taken by a Zeiss Evo 50 Scanning Electron Microscope.

FIG. 13 is a schematic diagram of the cross-flow reverse osmosis setup where the intrinsic separation properties of prepared substrate and composite membrane were tested. The following notations were used in the diagram (1) Feed tank. (2) Pump. (3)(4)(5) Pressure transducers for feed, retentate and permeate, respectively. (6) Membrane cell. (7) Balance. In the experiments, membranes were fixed between the top and bottom plates of a testing cell. Feed solution was pumped from the feed tank, flowed against the active layer of membrane and returned to the tank. Permeate was collected and measured the weight and concentration of solute to determine flux and rejection. Pure water flux of substrate was evaluated by circulating de-ionized water through the membrane cell under 100 kPa at a temperature of 23° C. Water and salt permeability of thin film composite forward osmosis membrane were evaluated by circulating 500 ppm aqueous sodium chloride solution through the membrane cell under 100 kPa at a temperature of 23° C. All of the membranes were tested after compaction under 100 kPa until a stable flux reading was obtained.

FIG. 14 shows the setup for testing forward osmosis performance of thin film composite membrane. The following notations were used in the diagram (1) Draw solution tank. (2)(6) Conductivity meters. (3)(5) Pumps. (4) Membrane cell. (7) Feed solution tank. (8) Balance. The setup consisted of two loops, with high concentration draw solution flowing on the permeate side and less concentrated feed solution flowing on the opposite side of membrane. Co-current flow was used to reduce strain on the membrane. As solutions with different osmotic pressure flowing on each side, water transported through the membrane from feed to draw solution while certain amount of salt may diffuse from draw solution to feed. Water flux was determined by measuring the weight change of feed solution. Salt flux was determined by calculating the change of total salt content in feed solution. A 10 mM aqueous sodium chloride solution was used as feed. Sodium chloride solutions with varied concentration, 0.5 M and 2.0 M, were used as draw solution. Both membrane orientations, with active layer facing draw solution (AL-DS) or with active layer facing feed solution (AL-FW), were applied for each group of membrane testing.

FIG. 15 is a table ('Table 6') summarizing the characteristics of substrates prepared for thin film composite flat-sheet forward osmosis membranes. Contact angle measurement was performed with Sessile Drop-method, using a Contact Angle System OCA (DataPhysics Instruments GmbH). Pore size of substrate surface was measured with bubble point method, using a Capillary Flow Porometer CFP-1500A (Porous Materials. Inc).

FIG. 16 is a table ('Table 7') summarizing the intrinsic separation properties and forward osmosis performance of thin film composite flat-sheet forward osmosis membranes synthesized. From the figure, it can be seen that the thin film composite flat-sheet forward osmosis membrane without reinforcing mesh had water permeability higher than $5 \times 10^{-12}$ m/s·Pa, and salt permeability lower than $5 \times 10^{-8}$ m/s (testing condition: 500 ppm sodium chloride solution as feed, trans-membrane pressure of 100 kPa, 23° C.).

Furthermore, it can be seen that for forward osmosis testing, the membrane exhibited a water flux value of higher than 20 L/m²·h and salt flux lower than 10 g/m²·h when rejection layer faced draw solution, with 10 mM and 0.5 M sodium chloride solutions as feed and draw respectively at 23° C.

Comparatively, the thin film composite flat-sheet forward osmosis membrane with mesh had water permeability higher than $2 \times 10^{-12}$ m/s·Pa, and salt permeability lower than $2 \times 10^{-7}$ m/s (testing condition: 500 ppm sodium chloride solution as feed, trans-membrane pressure of 100 kPa, 23° C.). For forward osmosis testing, the membrane had water flux higher than 5 L/m²·h and salt flux lower than 3 g/m²·h when rejection layer faced draw solution, with 10 mM and 0.5 M sodium chloride solutions as feed and draw, respectively, at 23° C.

By using a very open woven mesh, it impacts higher mechanical strength to the thin film composite membrane. At the same time, it does not unduly affect the diffusion in the support, thereby the internal concentration polarization of the membrane. A high water permeability and high selectivity thin film rejection layer is used for solute separation. The structures developed are more desirable in forward osmosis applications to reduce internal concentration polarization and to obtain high water flux. Additionally, materials for both layers are high-strength and chemically stable. This will enable the membrane to work in many applications even under harsh chemical environments.

By using materials such as polyamide, polysulfone, polyethersulfone, and polyester, which have very good chemical and hydrolysis resistance and durability, this reduces the risk of being degraded by microorganisms and chemicals in long term operation such as membrane bioreactor.

In term of structure, with the ultrathin and highly selective film as barrier layer, the membrane can achieve high water flux and stable good water quality. Meanwhile, the thin, porous substrate significantly minimize resistance to mass diffusion between bulk solution and the interior surface of rejection layer, thus minimize reduction of effective osmotic pressure difference caused by internal concentration polarization. Therefore, the membrane is very competitive in many applications, including water purification, wastewater treatment, seawater and brine desalination, food processing, and pharmaceutical industry.

The invention claimed is:
1. A method of forming a forward osmosis membrane comprising a porous substrate and a rejection layer, the method comprising
   a) forming a thin film of a polymer solution on a substrate, wherein the polymer solution comprises at least one polymer, an organic pore former comprising 0.5 wt % polyvinyl pyrrolidone, an inorganic salt pore former comprising 3 wt % lithium chloride, and a solvent which dissolves each of the at least one polymer homogeneously, wherein each wt % is based on the polymer solution;

b) immersing the thin film and the substrate in a coagulant bath which is at room temperature, wherein the coagulant bath comprises (i) the solvent and (ii) a non-solvent to each of the at least one polymer, both of which flow in the coagulant bath to remove the solvent in the thin film and have the thin film undergo phase inversion on the substrate to form a porous substrate comprising:
an overall porosity of 30% to 80%,
a first layer having elongated shaped pores, and
a second layer having a lower porosity than the first layer and a sponge-like structure;

c) heating the porous substrate in deionized water at 60° C. to 90° C. for 1 minute to less than 5 minutes followed by cooling the porous substrate in room temperature deionized water before forming a rejection layer, wherein both the heating and the cooling structurally stabilize the porous substrate, and wherein the porous substrate has a contact angle ranging from 50° to 80°; and d) forming the rejection layer on the second layer of the porous substrate by interfacial polymerization.

2. The method according to claim 1, wherein the thin film is formed on a woven mesh placed on the substrate.

3. The method according to claim 2, wherein the woven mesh has a porosity of about 20% to about 80%.

4. The method according to claim 1, wherein the at least one polymer is selected from the group consisting of polysulfone (PSF), polyether sulfone (PES), polyetherimide (PEI), polyacrylonitrile (PAN), polyvinylidene fluoride (PVDF), a combination thereof and derivatives thereof.

5. The method according to claim 1, wherein the solvent of the polymer solution is selected from the group consisting of 1-Methyl-2-Pyrrolidinone (NMP), dimethyl-acetamide (DMAc), dimethyl formamide (DMF), and combinations thereof.

6. The method according to claim 1, wherein the non-solvent in the coagulant bath is water, and the solvent in the coagulant bath is selected from the group consisting of 1-Methyl-2-Pyrrolidinone (NMP), dimethyl-acetamide (DMAc), dimethyl formamide (DMF), and combinations thereof.

7. The method according to claim 1, wherein forming the rejection layer on the porous substrate comprises contacting the porous substrate with an aqueous amine solution and an organic acyl halide solution.

8. The method according to claim 7, wherein the aqueous amine solution comprises m-phenylenediamine (MPD).

9. The method according to claim 7, wherein the organic acyl halide solution comprises an acyl chloride dissolved in a solvent which does not react with the acyl chloride.

10. The method according to claim 9, wherein the acyl chloride is selected from the group consisting of trimesoyl chloride (TMC), 5-isocyanato-isophthaloyl chloride (ICIC), 5-chloroformyloxy-isophthaloyl chloride (CFIC), combinations thereof and derivatives thereof.

11. The method according to claim 9, wherein the solvent which does not react with the acyl chloride is selected from the group consisting of aliphatic hydrocarbons, aromatic hydrocarbons, and halogenated hydrocarbons.

12. The method according to claim 1, wherein the mean pore diameter of the pores in the first layer is in the range of about 1 µm to about 7 µm.

13. The method according to claim 1, wherein the mean pore diameter of the pores in the second layer is in the range of about 10 nm to about 100 nm.

* * * * *

UNITED STATES PATENT AND TRADEMARK OFFICE
CERTIFICATE OF CORRECTION

| | | |
|---|---|---|
| PATENT NO. | : 12,048,897 B2 | Page 1 of 1 |
| APPLICATION NO. | : 13/981876 | |
| DATED | : July 30, 2024 | |
| INVENTOR(S) | : Chuyang Tang et al. | |

It is certified that error appears in the above-identified patent and that said Letters Patent is hereby corrected as shown below:

On the Title Page

Column 1 insert:
--(71) Applicant: Nanyang Technological University, Singapore (SG)--.

Signed and Sealed this
Thirty-first Day of December, 2024

Derrick Brent
*Acting Director of the United States Patent and Trademark Office*